(12) United States Patent
Aoki et al.

(10) Patent No.: US 11,720,195 B2
(45) Date of Patent: Aug. 8, 2023

(54) DISPLAY DEVICE WITH SENSOR

(71) Applicant: Japan Display Inc., Tokyo (JP)

(72) Inventors: Yoshinori Aoki, Minato-ku (JP); Yuji Maede, Minato-ku (JP); Jin Hirosawa, Minato-ku (JP); Yuzo Kanari, Minato-ku (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/675,490

(22) Filed: Feb. 18, 2022

(65) Prior Publication Data

US 2022/0171488 A1 Jun. 2, 2022

Related U.S. Application Data

(63) Continuation of application No. 17/130,541, filed on Dec. 22, 2020, now Pat. No. 11,287,915, which is a
(Continued)

(30) Foreign Application Priority Data

Feb. 26, 2018 (JP) .................................. 2018-031551

(51) Int. Cl.
G06F 3/041 (2006.01)
G06F 3/044 (2006.01)
(Continued)

(52) U.S. Cl.
CPC ........ G06F 3/0412 (2013.01); G02F 1/13338 (2013.01); G02F 1/133512 (2013.01); G02F 1/134309 (2013.01); G06F 3/044 (2013.01)

(58) Field of Classification Search
CPC .... G06F 3/0412; G06F 3/044; G02F 1/13338; G02F 1/133512; G02F 1/134309
See application file for complete search history.

(56) References Cited

U.S. PATENT DOCUMENTS

2015/0220204 A1 8/2015 Noguchi et al.
2016/0188063 A1* 6/2016 Kim ...................... G06F 3/0412
345/173
(Continued)

FOREIGN PATENT DOCUMENTS

CN 107407984 A 11/2017
JP 2015-143933 8/2015

OTHER PUBLICATIONS

Combined Chinese Office Action and Search Report dated Dec. 31, 2021 in corresponding Chinese Patent Application No. 201910131127.X (with English Translation and English Translation of Category of Cited Documents) citing document AO therein, 15 pages.

*Primary Examiner* — Nathanael R Briggs
(74) *Attorney, Agent, or Firm* — Maier & Maier, PLLC

(57) ABSTRACT

According to an aspect, a display device with a sensor includes: a first substrate; detection electrodes arrayed in a matrix in a first direction and a second direction intersecting the first direction above the first substrate; sensor wires coupled to one of the detection electrodes; pixels each including sub-pixels and arrayed in a matrix in the first and second directions; scanning lines scanning switching elements of the sub-pixels and extending in the first direction; and signal lines coupled to the switching elements and extending in the second direction. One of the sensor wires overlaps one of the signal lines. The sensor wires each have, at a part thereof, a coupling part coupled to the corresponding detection electrode. The pixels include a first pixel with the coupling part and a second pixel without the coupling part. The first and second pixels are alternately disposed in the first and second directions.

11 Claims, 17 Drawing Sheets

Related U.S. Application Data continuation of application No. 16/896,672, filed on Jun. 9, 2020, now Pat. No. 10,915,197, which is a continuation of application No. 16/284,305, filed on Feb. 25, 2019, now Pat. No. 10,712,856.

(51) Int. Cl.
  *G02F 1/1343* (2006.01)
  *G02F 1/1335* (2006.01)
  *G02F 1/1333* (2006.01)

(56) References Cited

U.S. PATENT DOCUMENTS

2016/0253023 A1  9/2016  Aoyama et al.
2016/0291749 A1  10/2016  Zhou et al.
2018/0329544 A1  11/2018  Yeh \* cited by examiner

DISPLAY DEVICE WITH SENSOR

CROSS-REFERENCE TO RELATED APPLICATIONS

This application is a continuation of U.S. application Ser. No. 17/130,541 tiled Dec. 22, 2020, which is a continuation of U.S. application Ser. No. 16/896,672 filed Jun. 9, 2020, which is a continuation of U.S. application Ser. No. 16/284, 305 filed Feb. 25, 2019, and claims prior4 from Japanese Application No. 2018-031551, tiled on Feb. 26, 2018, the contents of each of which are incorporated by reference herein in its entirety.

BACKGROUND

1. Technical Field

The present disclosure relates to a display device with a sensor.

2. Description of the Related Art

Japanese Patent Application Laid-open Publication No. 2015-143933 (JP-A-2015-143933) describes a display device with a capacitance sensor. The display device with a capacitance sensor includes a plurality of detection electrodes and a plurality of sensor wires. The sensor wires are coupled to the detection electrodes in one-to-one basis and made of a metal.

To suppress waveform degradation in drive signals supplied to the detection electrodes, it has been demanded to reduce wiring resistance by electrically coupling a plurality of sensor wires to each of the detection electrodes. The sensor wires coupled to the detection electrode, however, are disposed in a display region. If the number of sensor wires coupled to the detection electrode increases, the sensor wires may possibly be visually recognized.

For the foregoing reasons, there is a need for a display device with a sensor that makes sensor wires coupled to detection electrode less noticeable.

SUMMARY

According to an aspect, a display device with a sensor includes: a first substrate; a plurality of detection electrodes arrayed in a matrix in a first direction and a second direction intersecting the first direction above the first substrate; a plurality of sensor wires coupled to one of the detection electrodes; a plurality of pixels each including a plurality of sub-pixels and arrayed in a matrix in the first direction and the second direction; a plurality of scanning lines configured to scan switching elements of the sub-pixels and extending in the first direction; and a plurality of signal lines coupled to the switching elements of the sub-pixels and extending in the second direction. One of the sensor wires overlaps one of the signal lines. The sensor wires each have, at a part thereof, a coupling part coupled to the corresponding detection electrode. The pixels include a first pixel including the coupling part and a second pixel not including the coupling part. The first pixel and the second pixel are alternately disposed in the first direction. The first pixel and the second pixel are alternately disposed in the second direction.

DETAILED DESCRIPTION

Figure 1:
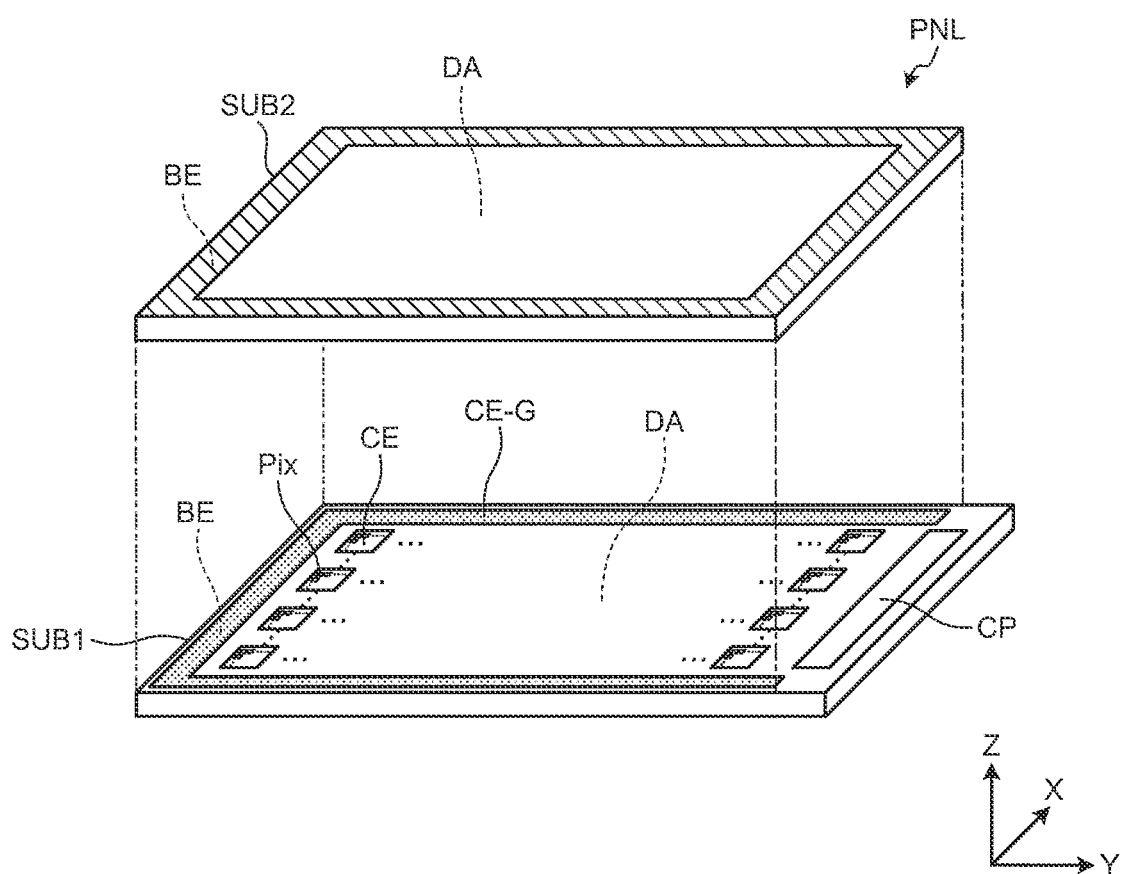
FIG. 1 is an exploded perspective view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

FIG. 1 is an exploded perspective view of a display device according to a first embodiment. As illustrated in FIG. 1, a display device PNL with a sensor includes an array substrate SUB1 and a counter substrate SUB2. As illustrated in FIG.

1, the display device PNL with a sensor has a peripheral region BE outside a display region DA. While the display region DA has a rectangular shape, the outer shape of the display region DA is not particularly limited. The display region DA may have a cut-out or have another polygonal shape, for example. The display region DA may have another shape, such as a circular or elliptic shape.

A first direction X according to the present embodiment extends along the short side of the display region DA. A second direction Y intersects (or is orthogonal to) the first direction X. The first direction X and the second direction Y are not limited thereto, and the second direction Y may intersect the first direction X at an angle other than 90 degrees. The plane defined by the first direction X and the second direction Y is parallel to the surface of the array substrate SUB1. A third direction Z orthogonal to the first direction X and the second direction Y is the thickness direction of the array substrate SUB1.

The display region DA is a region for displaying images and overlaps a plurality of pixels Pix. The peripheral region BE is inside the outer periphery of the array substrate SUB1 and outside the display region DA. The peripheral region BE may have a frame shape surrounding the display region DA. In this case, the peripheral region BE may also be referred to as a frame region.

The display region DA that displays images includes a sensor region included in a detection device that detects capacitance. As illustrated in FIG. 1, a plurality of detection electrodes CE are arrayed in a matrix (row-column configuration) in the first direction X and the second direction Y in the display region DA. The detection electrodes CE each have a rectangular or square shape schematically in planar view. The shape of the detection electrodes CE will be described later in greater detail. The detection electrodes CE are made of a translucent conductive material, such as indium tin oxide (ITO).

As illustrated in FIG. 1, the peripheral region BE on a first surface of the array substrate SUB1 is provided with outer edge wiring CE-G and an integrated circuit CP. The outer edge wiring CE-G, for example, is provided continuously along the long sides and a short side of the display region DA and surrounds the display region DA.

The display device PNL with a sensor integrates the sensor region with the display region DA. Specifically, in the display device PNL with a sensor, part of members in the display region DA serves as the detection electrodes CE in the sensor region.

Figure 2:
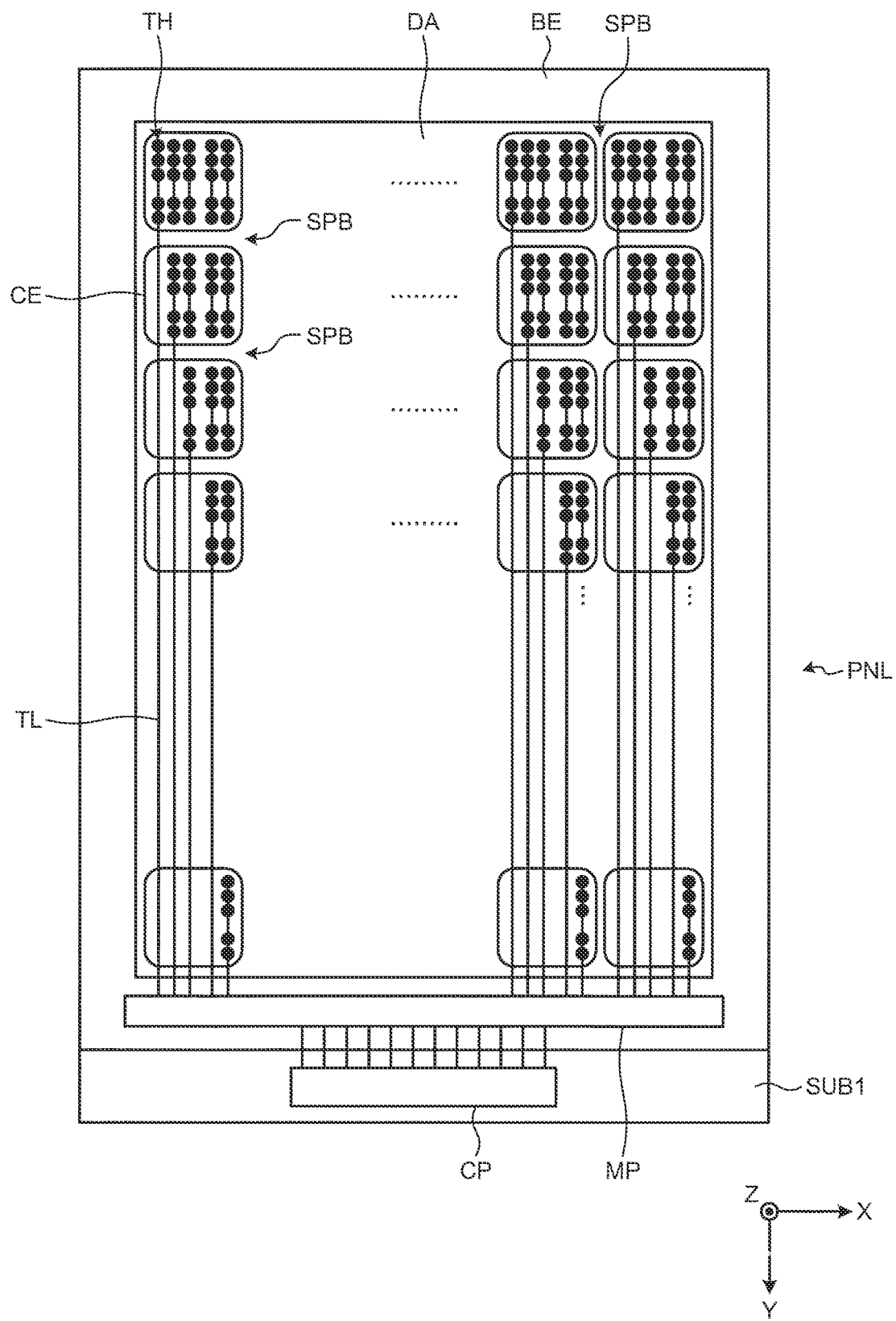
FIG. 2 is a plan view schematically illustrating an array substrate.

FIG. 2 is a plan view schematically illustrating the array substrate. As illustrated in FIG. 2, the detection electrodes CE are arranged in a matrix (row-column configuration) by being divided by splits SPB in in the first direction X and the second direction Y. A coupling circuit MP and the integrated circuit CP are provided on a short side of the peripheral region BE. A flexible substrate, which is not illustrated, is coupled to the short side of the peripheral region BE. The positions of the coupling circuit MP and the integrated circuit CP are not limited thereto, and they may be provided on a control substrate outside the module or the flexible substrate, for example.

The detection electrodes CE are electrically coupled to the integrated circuit CP via sensor wires TL and the coupling circuit MP. The sensor wires TL are electrically coupled to the respective detection electrodes CE disposed in the display region DA and extend to the peripheral region BE. The sensor wires TL extend along the second direction Y and are disposed side by side in the first direction X. A drive circuit built into the integrated circuit CP, for example, is coupled to the detection electrodes CE via the coupling circuit MP disposed in the peripheral region BE and the sensor wires TL.

Contact holes TH each have a coupling part CT (refer to FIGS. 10 to 12) at which the detection electrode CE and the sensor wire TL overlapping the detection electrode CE are electrically coupled to each other. In FIG. 2, one sensor wire TL is schematically coupled to one detection electrode CE. In an actual configuration, the sensor wires TL each bundle a plurality of wires and are routed in the display region DA.

The display device PNL with a sensor includes the coupling circuit MP. The coupling circuit MP is provided between the detection electrodes CE and the integrated circuit CP. The coupling circuit MP switches coupling and decoupling the detection electrodes CE to be a target of detection drive to and from the integrated circuit CP in accordance with control signals Vsc1 (refer to FIG. 15) supplied from the integrated circuit CP. The coupling circuit MP includes analog front ends.

Figure 3:
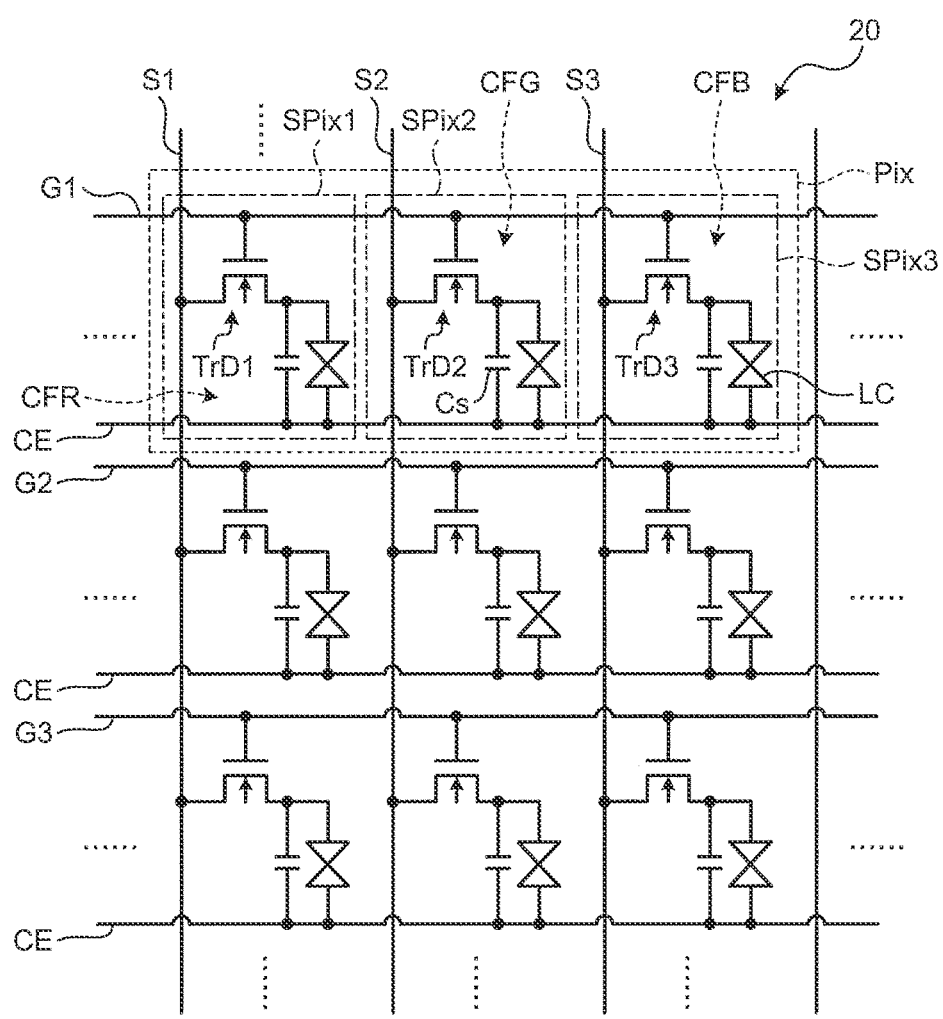
FIG. 3 is a circuit diagram of a pixel array in a display region according to the first embodiment.

FIG. 3 is a circuit diagram of a pixel array in the display region according to the first embodiment. In the following description, a plurality of scanning lines G1, G2, and G3 may be collectively referred to as scanning lines GL. A plurality of signal lines S1, S2, and S3 may be collectively referred to as signal lines SL. The array substrate SUB1 is provided with a switching element TrD1 of a sub-pixel SPix1, a switching element TrD2 of a sub-pixel SPix2, and a switching element TrD3 of a sub-pixel SPix3, the signal lines SL, the scanning lines GL, and other components illustrated in FIG. 3. The signal lines S1, S2, and S3 are wiring that supplies pixel signals Vpix (refer to FIG. 15) to pixel electrodes PE1, PE2, and PE3 (refer to FIG. 4), respectively. The gate lines G1, G2, and G3 are wiring that supplies gate signals for driving the switching elements TrD1, TrD2, and TrD3.

As illustrated in FIG. 3, the pixels Pix in display region DA illustrated in FIG. 1 each include the sub-pixels SPix1, SPix2, and SPix3 arrayed in a matrix (row-column configuration). In the following description, the sub-pixels SPix1, SPix2, and SPix3 may be collectively referred to as sub-pixels SPix. The sub-pixels SPix1, SPix2, and SPix3 include the switching elements TrD1, TrD2, and TrD3, respectively, and each include capacitance of a liquid crystal layer LC. The switching elements TrD1, TrD2, and TrD3 are thin-film transistors and are n-channel metal oxide semiconductor (MOS) TFTs in this example. A sixth insulating film 16 (refer to FIG. 8) is provided between the pixel electrodes PE1, PE2, and PE3, which will be described later, and the detection electrodes CE, thereby generating holding capacitance Cs illustrated in FIG. 3.

Color filters CFR, CFG, and CFB illustrated in FIG. 3 are cyclically arrayed color regions in respective three colors of red (R), green (G), and blue (B), for example. The color regions in the three colors of R, G, and B serve as a set and correspond to the respective sub-pixels SPix1, SPix2, and SPix3 illustrated in FIG. 3. A set of the sub-pixels SPix1, SPix2, and SPix3 corresponding to the respective color regions in the three colors serves as one pixel Pix. The color filters may include color regions in four or more colors.

Figure 4:
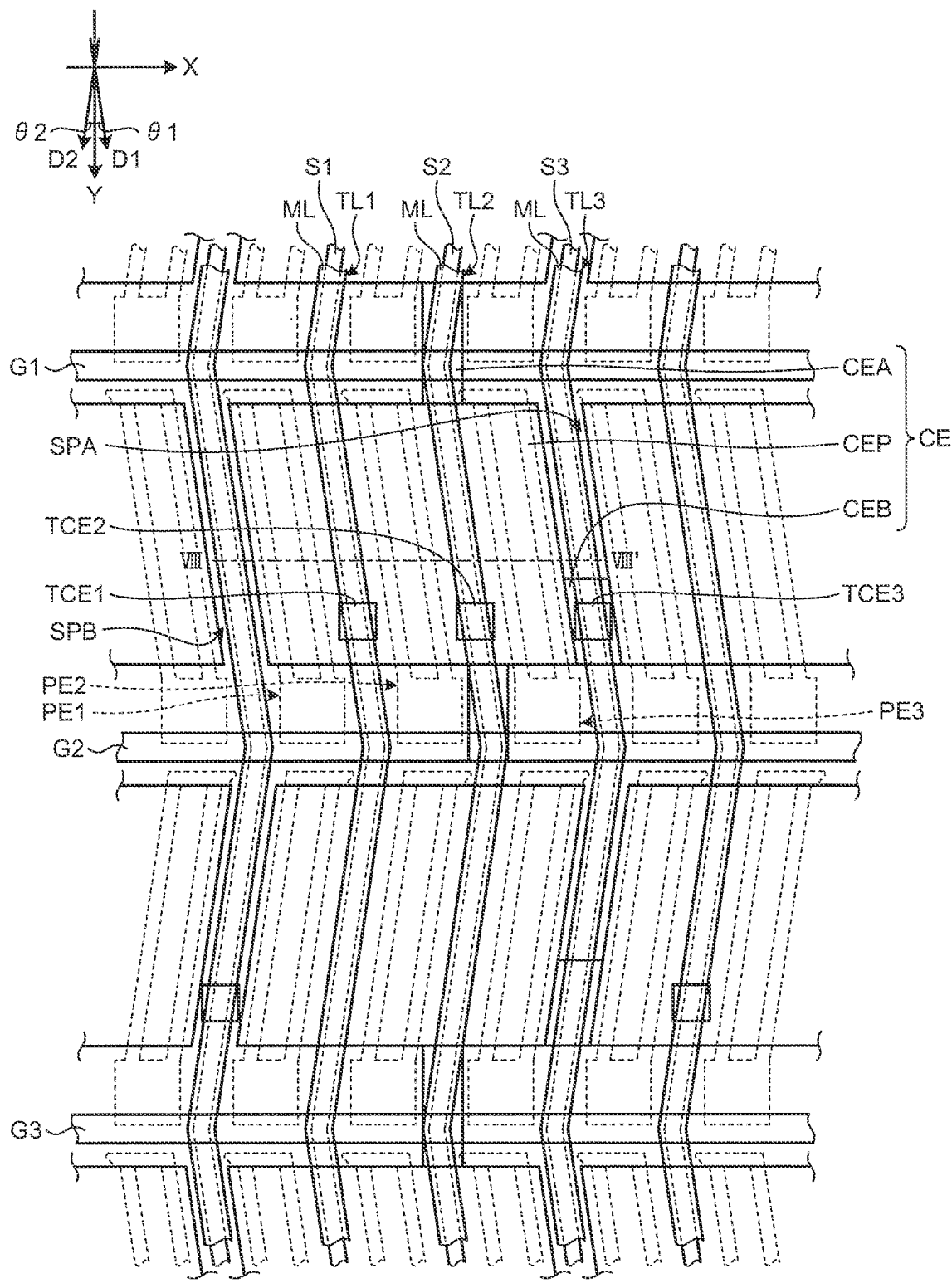
FIG. 4 is a plan view for explaining detection electrodes in a schematic plan view of pixels.
Figure 5:
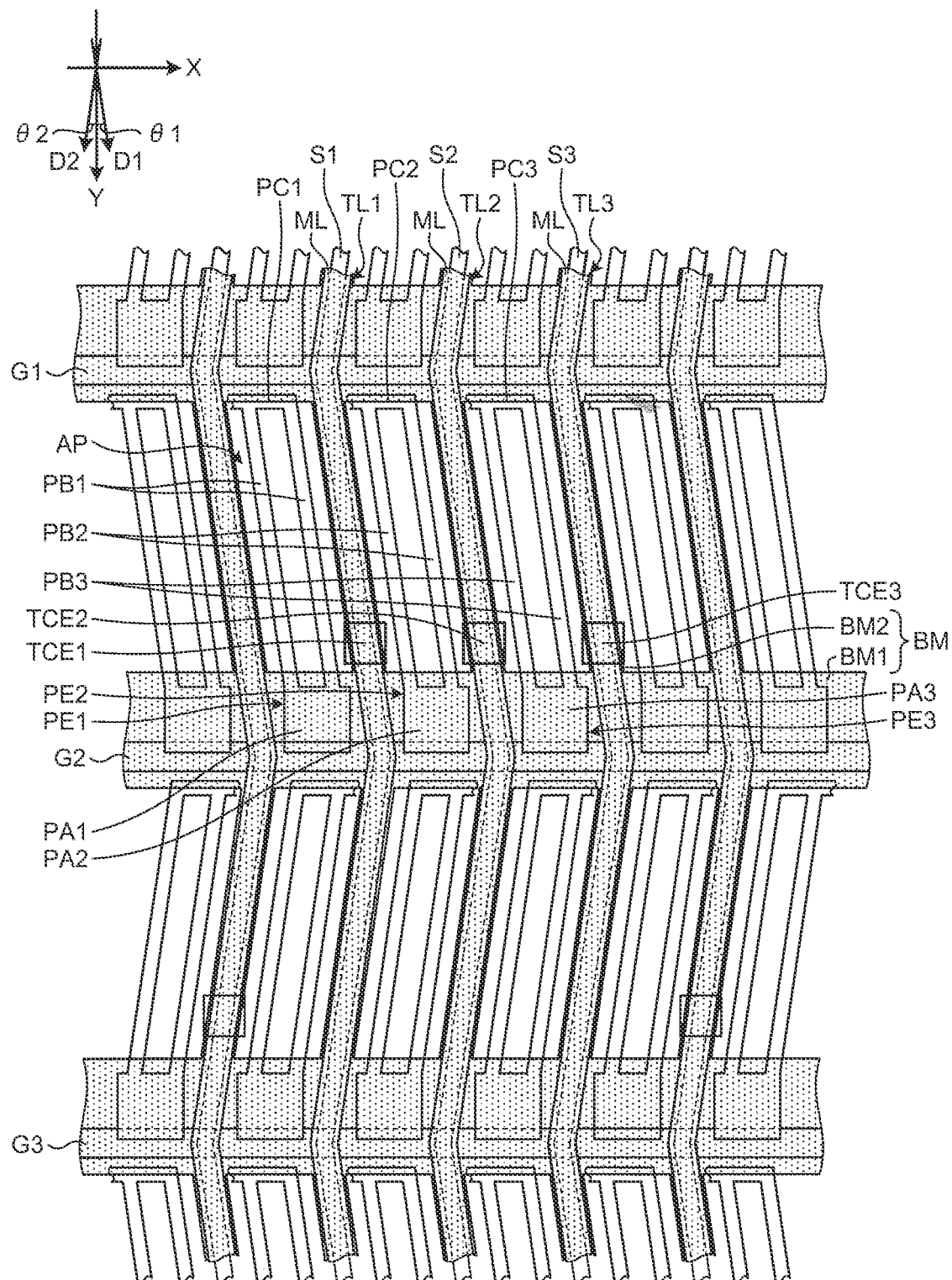
FIG. 5 is a plan view for explaining pixel electrodes in the schematic plan view of the pixels.
Figure 6:
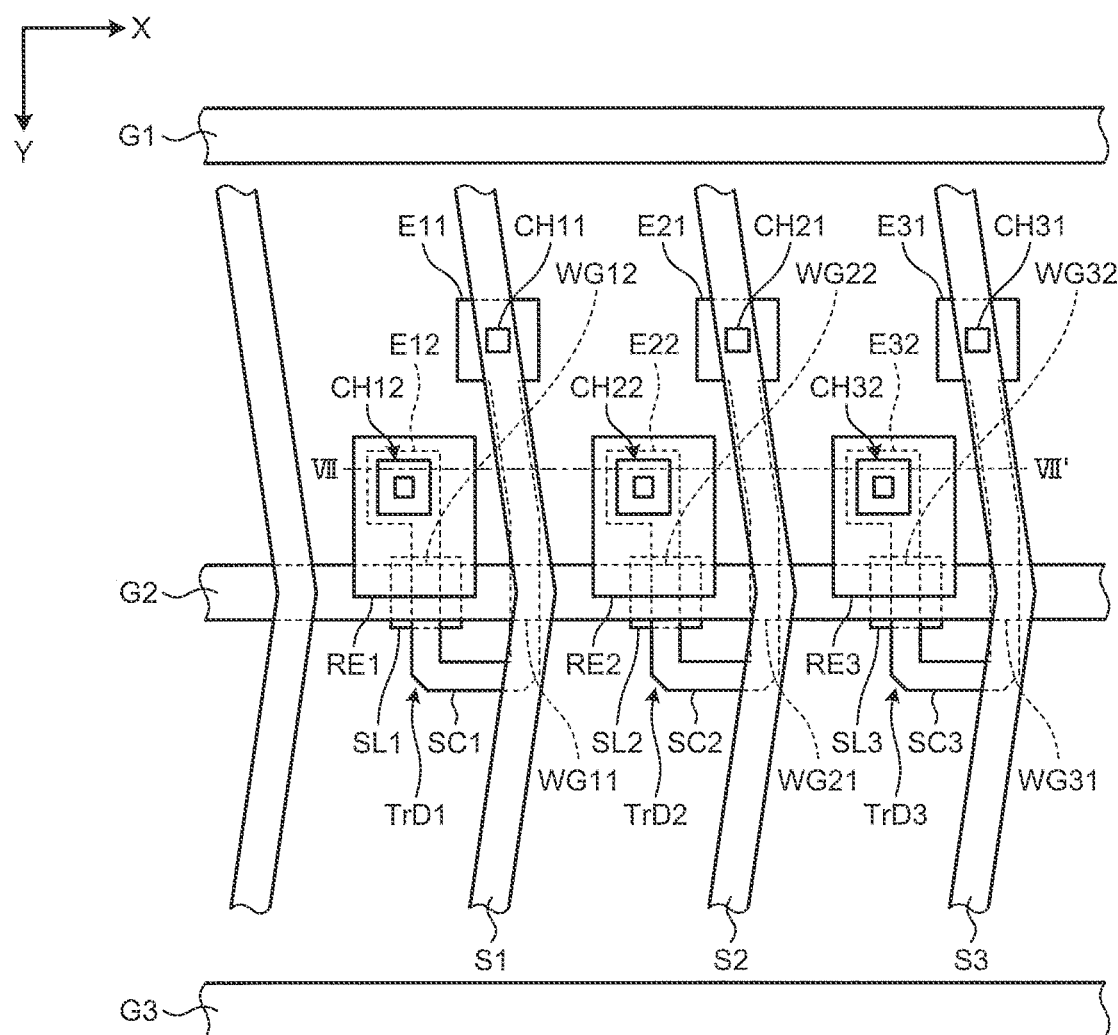
FIG. 6 is a plan view for explaining switching elements.
Figure 7:
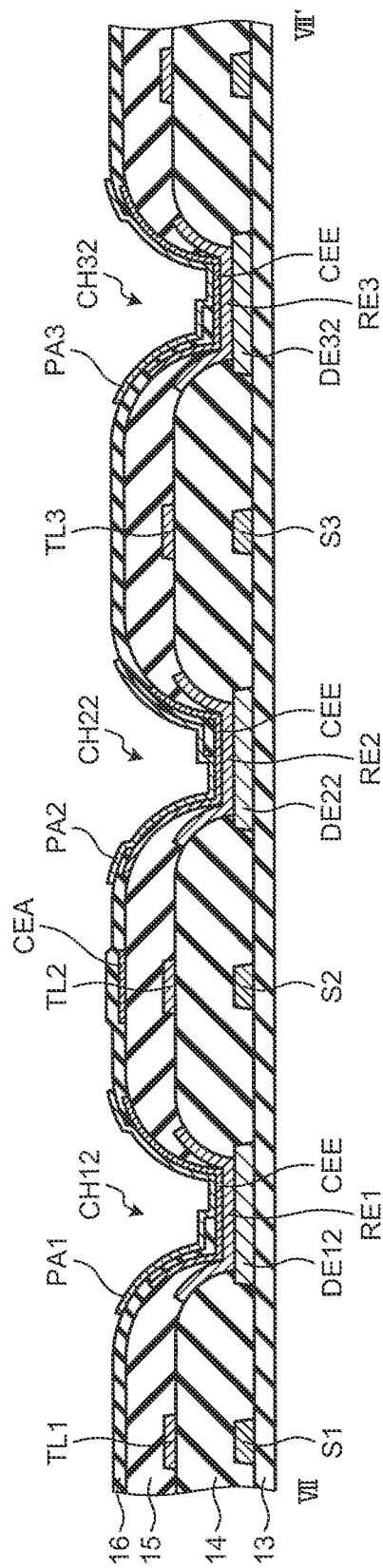
FIG. 7 is a partial sectional view for explaining the VII-VII' section in FIG. 6.
Figure 8:
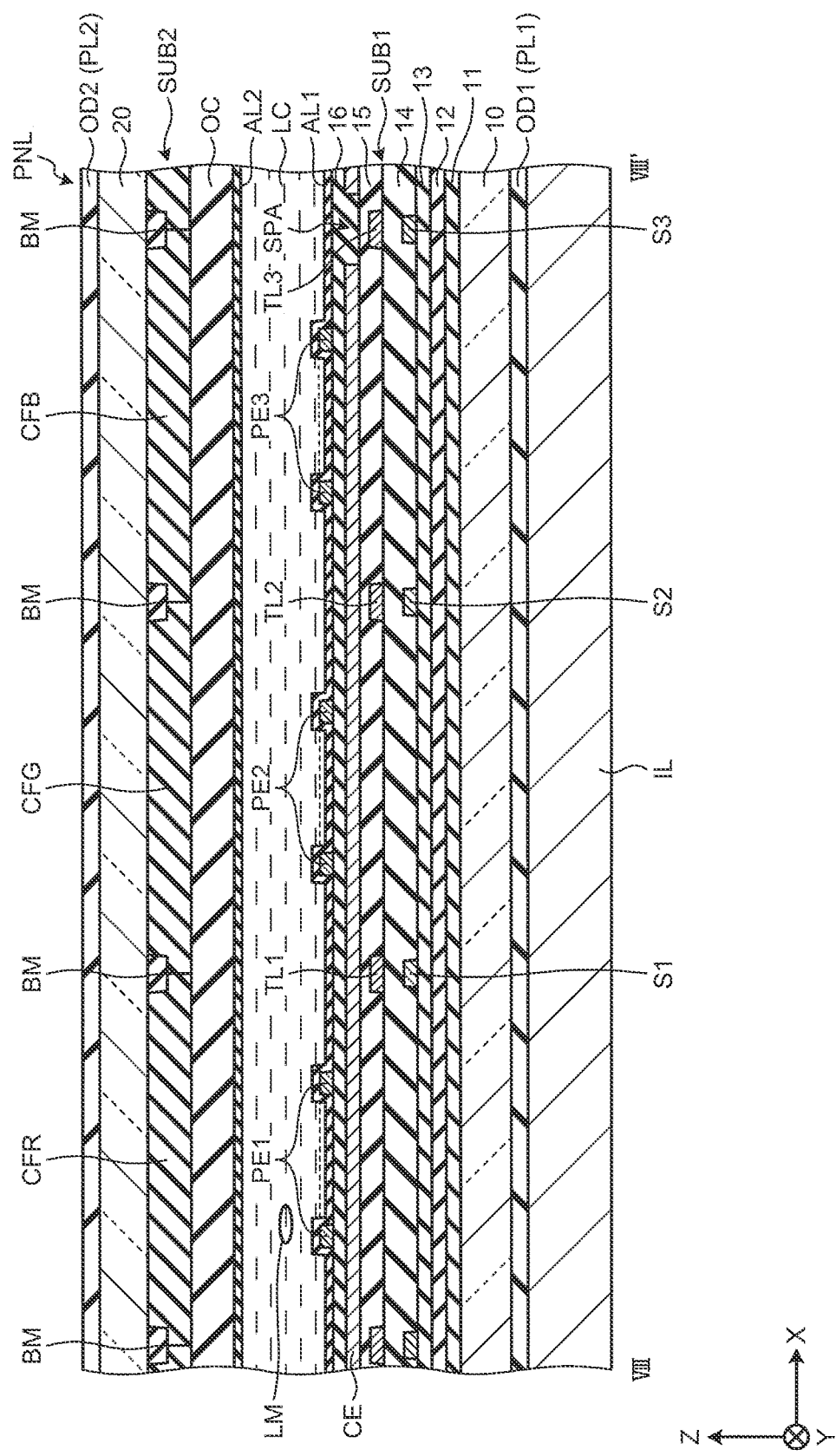
FIG. 8 is a partial sectional view for explaining the VIII-VIII' section in FIG. 4.
Figure 9:
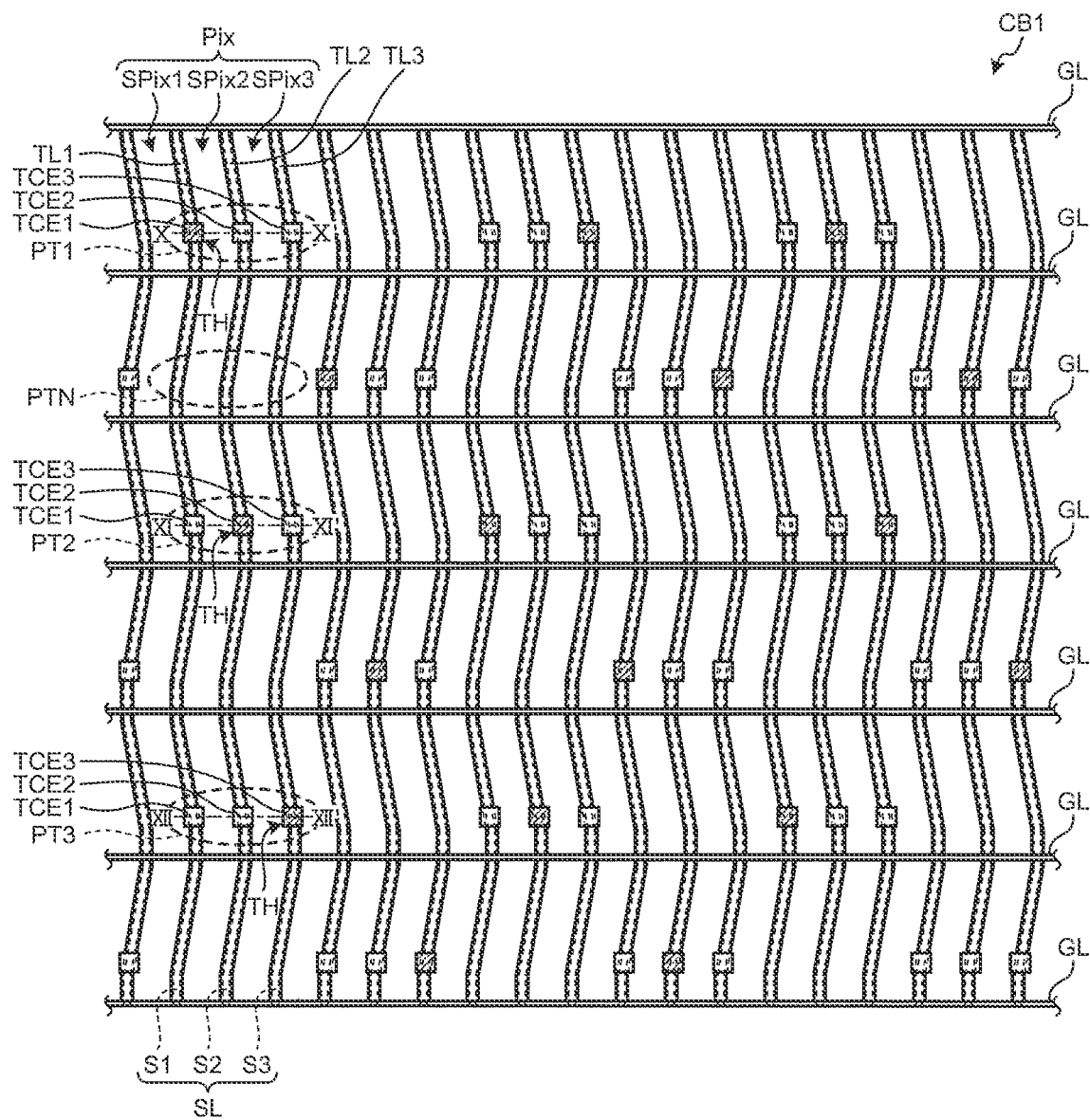
FIG. 9 is a diagram for explaining widened parts of sensor wires.
Figure 10:
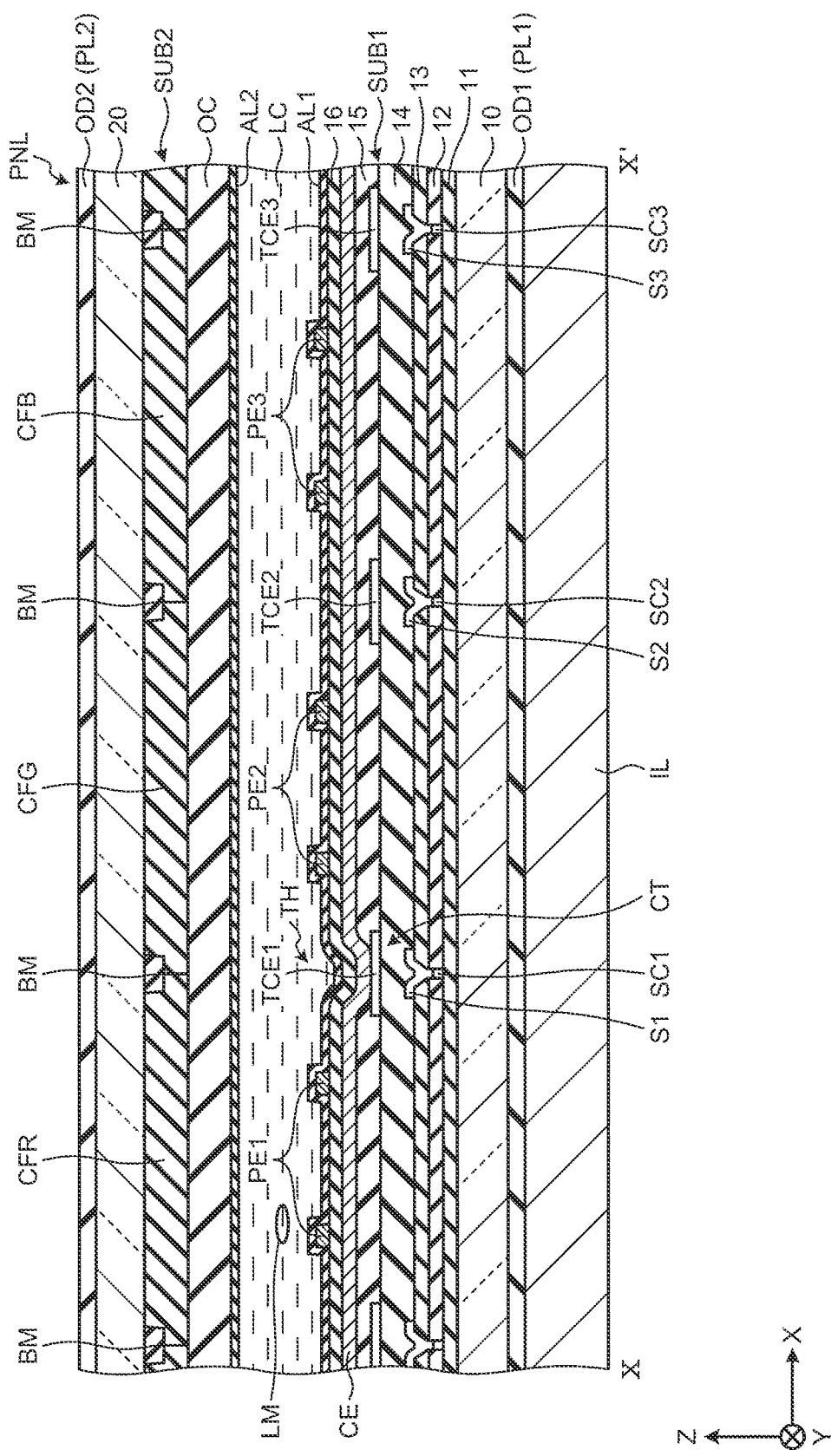
FIG. 10 is a partial sectional view for explaining the X-X' section in FIG. 9.
Figure 11:
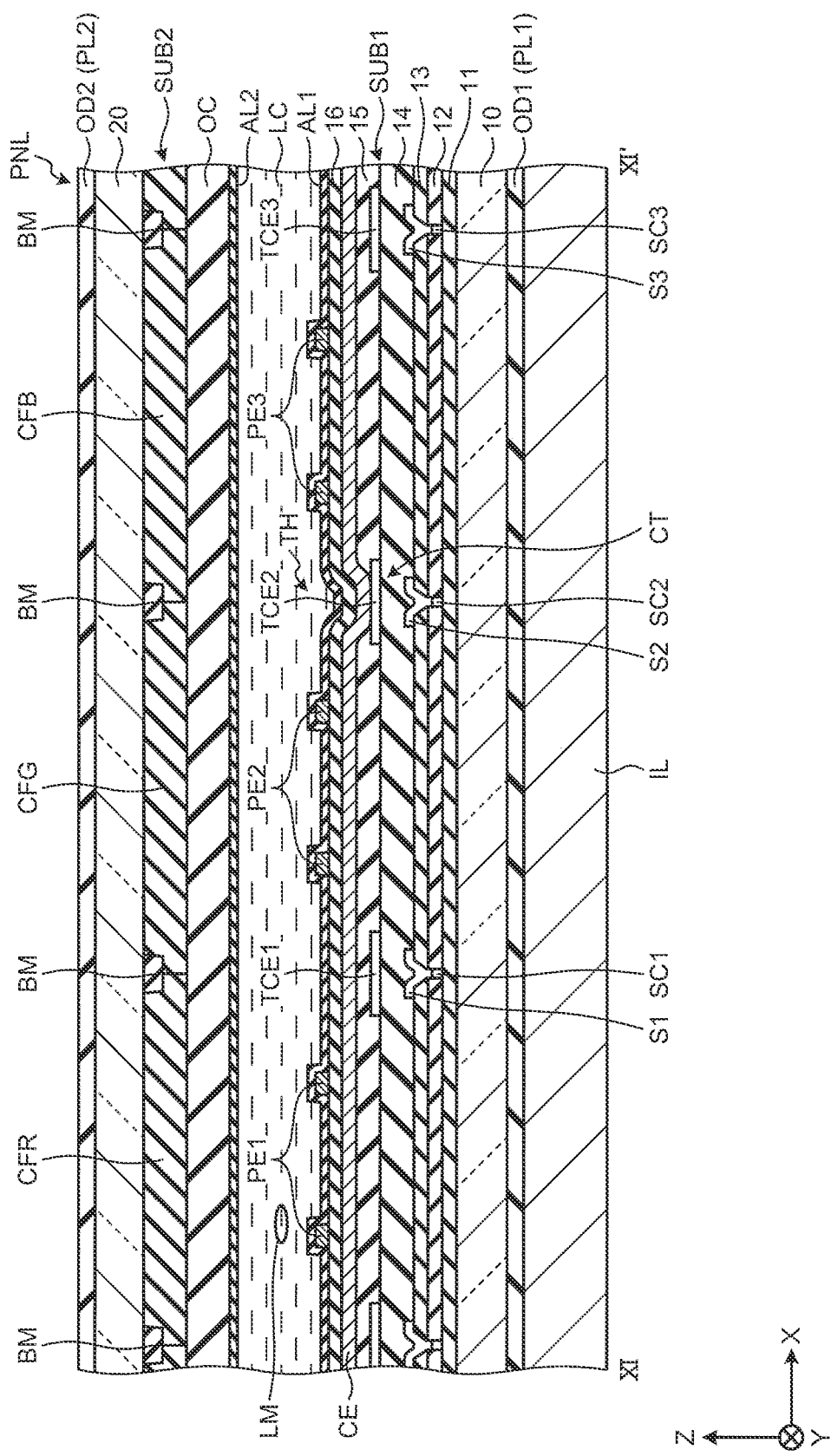
FIG. 11 is a partial sectional view for explaining the XI-XI' section in FIG. 9.
Figure 12:
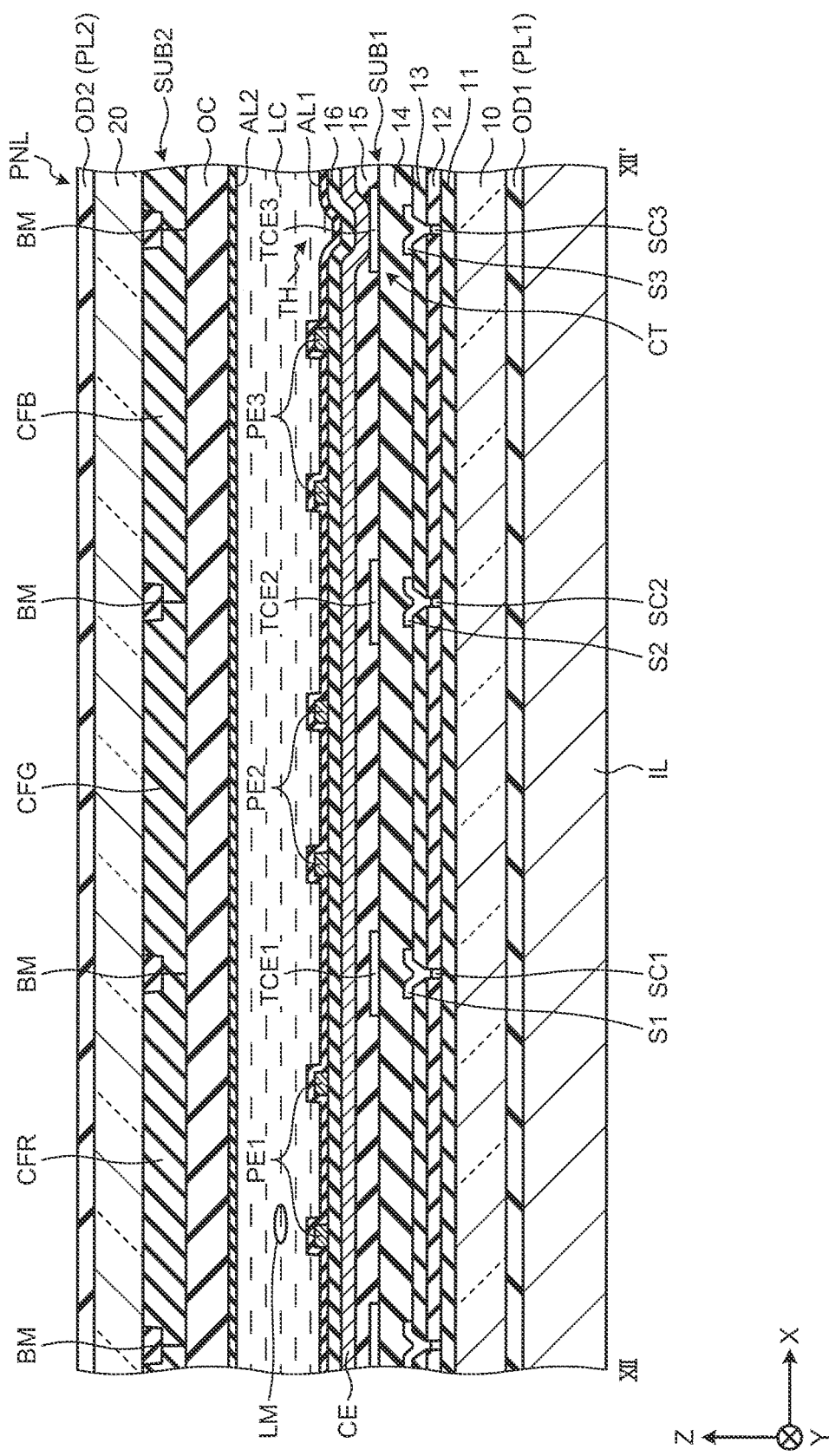
FIG. 12 is a partial sectional view for explaining the XII-XII' section in FIG. 9.
Figure 13:
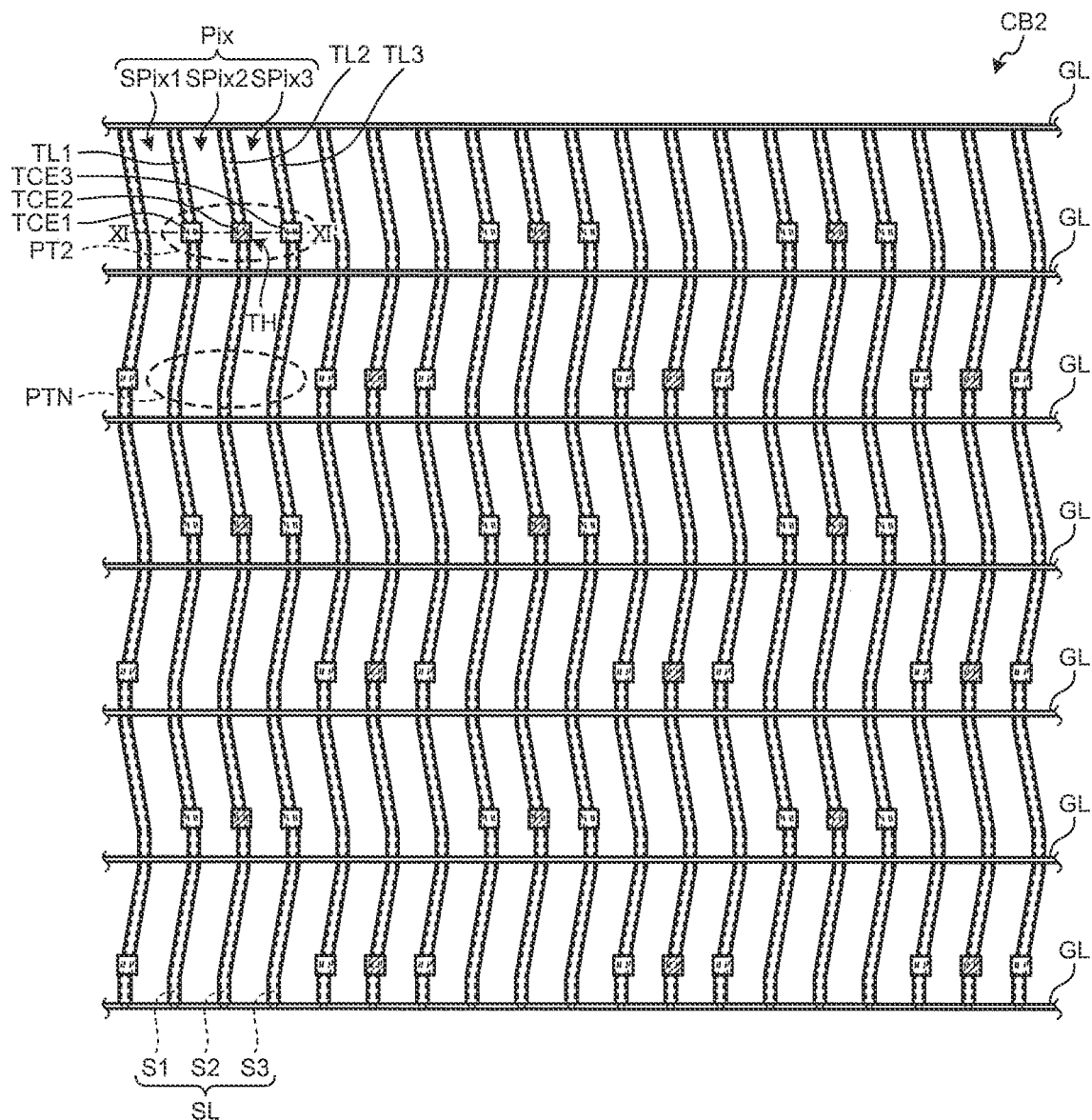
FIG. 13 is a diagram for explaining the widened parts of the sensor wires.
Figure 14:
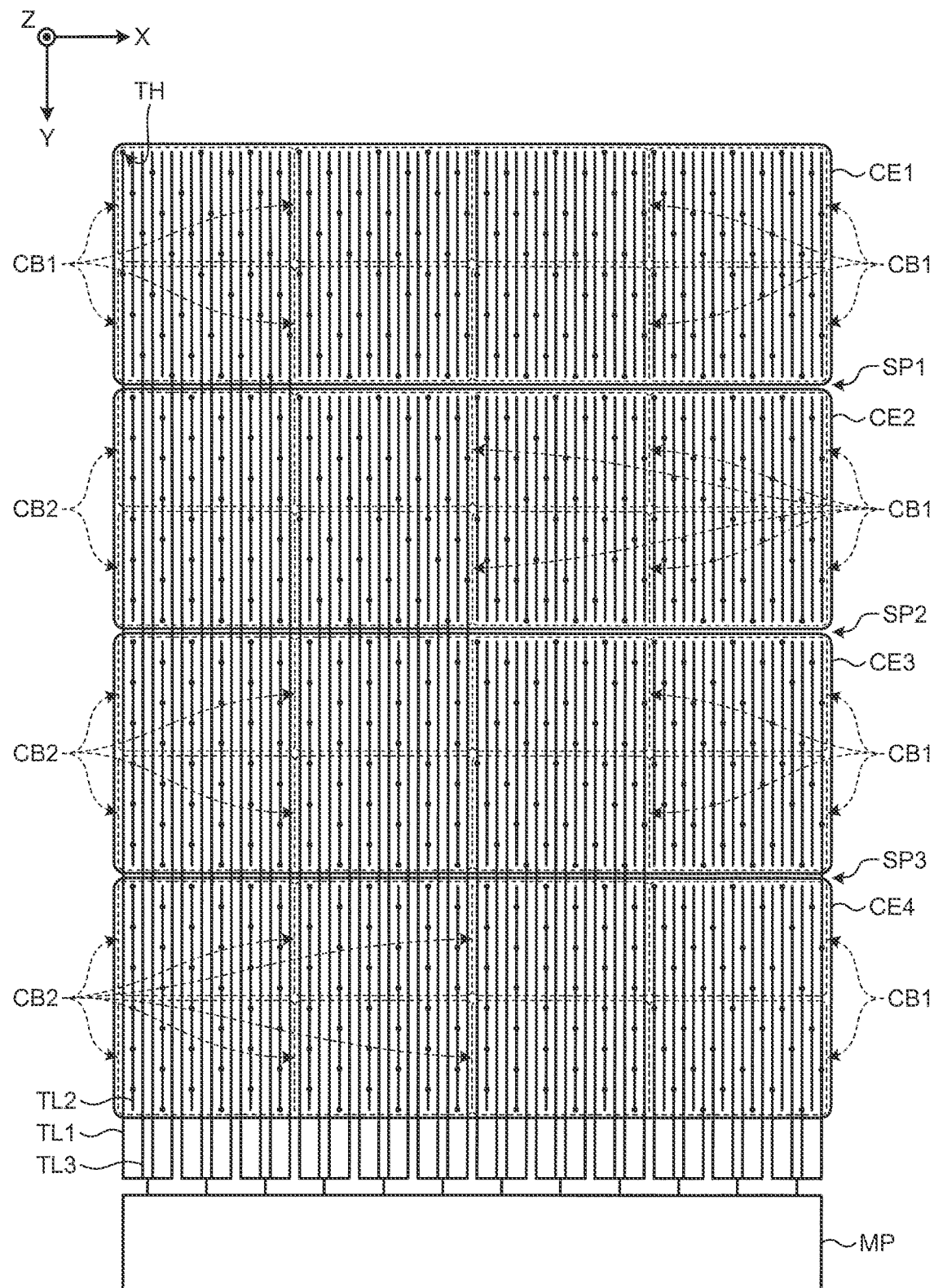
FIG. 14 is a diagram for explaining coupling positions between the sensor wires and the detection electrodes.

FIG. 4 is a plan view for explaining the detection electrodes in a schematic plan view of the pixels. FIG. 5 is a plan view for explaining the pixel electrodes in the schematic plan view of the pixels. FIG. 6 is a plan view for explaining the switching elements. FIG. 7 is a partial sectional view for explaining the VII-VII' section in FIG. 6. FIG. 8 is a partial sectional view for explaining the VIII-VIII' section in FIG. 4. FIG. 9 is a diagram for explaining widened parts of the sensor wires. FIG. 10 is a partial sectional view for explaining the X-X' section in FIG. 9. FIG. 11 is a partial sectional view for explaining the XI-XI' section in FIG. 9. FIG. 12 is a partial sectional view for explaining the XII-XII' section in FIG. 9. FIG. 13 is a diagram for explaining the widened parts of the sensor wires. FIG. 14 is a diagram for explaining coupling positions between the sensor wires and the detection electrodes. The following specifically describes the display device according to the first embodiment with reference to FIGS. 1 to 14.

As illustrated in FIG. 8, the signal lines S1, S2, and S3, the pixel electrodes PE1, PE2, and PE3, the detection electrodes CE, and a plurality of sensor wires TL1, TL2, and TL3 are provided above a first insulating substrate 10. In the following description, the sensor wires TL1, TL2, and TL3 may be collectively referred to as sensor wires TL. As illustrated in FIG. 4, the scanning lines G1 to G3 extend along the first direction X and are disposed side by side at regular pitches in the second direction Y. The scanning lines G1 to G3, which are not illustrated in FIG. 8, are also provided above the first insulating substrate 10.

In FIGS. 4 and 5, D1 is defined as a direction intersecting the second direction Y in a counterclockwise manner at an acute angle, and D2 is defined as a direction intersecting the second direction Y in a clockwise manner at an acute angle. An angle θ1 between the second direction Y and the direction D1 is substantially equal to an angle θ2 between the second direction Y and the direction D2. The signal lines S1 to S3 extend approximately along the second direction Y and are disposed side by side at regular pitches in the first direction X. In the illustrated example, the signal lines S1 to S3 extend in the direction D1 between the scanning line G1 and the scanning line G2, and extend in the direction D2 between the scanning line G2 and the scanning line G3. The scanning lines G1 to G3 and the signal lines S1 to S3 intersect each other in a planar view of the X-Y plane.

As illustrated in FIG. 6, the switching element TrD1 is positioned near the intersection of the scanning line G2 and the signal line S1 and electrically coupled to the scanning line G2 and the signal line S1. The switching element TrD2 is positioned near the intersection of the scanning line G2 and the signal line S2 and electrically coupled to the scanning line G2 and the signal line S2. The switching element TrD3 is positioned near the intersection of the scanning line G2 and the signal line S3 and electrically coupled to the scanning line G2 and the signal line S3.

As illustrated in FIG. 5, the pixel electrodes PE1, PE2, and PE3 are disposed side by side in the first direction X with intervals interposed therebetween. The pixel electrode PE1 is positioned between two signal lines. The pixel electrode PE1 has a contact part PA1, electrode parts PB1, and a connecting part PC1. The contact part PA1 is electrically coupled to the switching element TrD1 (refer to FIG. 6). The electrode part PB1 extends from the contact part PA1 toward the scanning line G1, which is the opposite side of the scanning line G2. The electrode part PB1 may also be referred to as a strip electrode, a linear electrode, or a comb electrode, for example. In FIG. 5, one pixel electrode PE1 includes two electrode parts PB1. The two electrode parts PB1 are coupled to the contact part PA1. The electrode parts PB1 are disposed side by side in the first direction X with an interval. The connecting part PC1 is connected to the ends of the two electrode parts PB1. If part of a first electrode part PB1 is broken, this structure can supply a pixel potential to the first electrode part PB1 from a second electrode part PB1 via the connecting part PC1.

The shape of the pixel electrode PE1 is not limited to that in the example illustrated in FIG. 5. The pixel electrode PE1 does not necessarily have the connecting part PC1, and the number of electrode parts PB1 may be not two but three or four, for example.

The pixel electrode PE2 has substantially the same shape as that of the pixel electrode PE1. The pixel electrode PE2 is positioned between two signal lines. The pixel electrode PE2 has a contact part PA2, electrode parts PB2, and a connecting part PC2. The contact part PA2 is electrically coupled to the switching element TrD2 (refer to FIG. 6). The electrode parts PB2 extend from the contact part PA2 toward the scanning line G1.

The pixel electrode PE3 has substantially the same shape as that of the pixel electrode PE1. The pixel electrode PE3 is positioned between two signal lines. The pixel electrode PE3 has a contact part PA3, electrode parts PB3, and a connecting part PC3. The contact part PA3 is electrically coupled to the switching element TrD3 (refer to FIG. 6). The electrode parts PB3 extend from the contact part PA3 toward the scanning line G1.

All of the electrode parts PB1, PB2, and PB3 extend in the same direction parallel to the direction D1. All of the electrode parts PB1, PB2, and PB3 extend from the respective contact parts toward the scanning line G1. While the pixel electrodes positioned between the scanning lines G2 and G3 have the same structure as that of the pixel electrodes PE1 to PE3, their electrode parts extend along the direction D2.

As illustrated in FIG. 4, the detection electrode CE includes a main detection electrode CEP, a sub-detection electrode CEA, and a sub-detection electrode CEB. The main detection electrodes CEP are provided on substantially the whole display region DA (refer to FIG. 1) of the array substrate SUB1. In other words, the sub-pixels include the pixel electrodes PE1, PE2, and PE3, and the main detection electrodes CEP (detection electrodes CE) are provided in a region overlapping the pixel electrodes PE1, PE2, and PE3. In a planar view of the X-Y plane, the main detection electrodes CEP overlap the pixel electrodes PE1, PE2, and PE3, the signal lines S1, S2, and S3, and the sensor wires TL1 and TL2 but do not overlap the scanning lines G1, G2, and G3.

As illustrated in FIG. 4, the sub-detection electrode CEA extends in the second direction Y and electrically couples the main detection electrodes CEP disposed side by side in the second direction Y. In a planar view of the X-Y plane, the sub-detection electrodes CEA overlap the scanning lines G1, G2, and G3, the signal line S2, and the sensor wire TL2 but do not overlap the pixel electrodes PE1, PE2, and PE3, the signal lines S1 and S3, or the sensor wires TL1 and TL3. If no sub-detection electrode CEA is provided between the main detection electrodes CEP disposed side by side in the second direction Y, a slit SPB is formed.

As illustrated in FIG. 4, the sub-detection electrode CEB extends in the first direction X and electrically couples the main detection electrodes CEP disposed side by side in the first direction X. As illustrated in FIG. 4, if no sub-detection electrode CEB is provided between the main detection electrodes CEP disposed side by side in the first direction X, the slit SPB is formed. In a planar view of the X-Y plane, the sub-detection electrode CEB overlaps the signal line S3, the sensor wire TL3, and a widened part TCE3 but does not overlap the pixel electrodes PE1, PE2, and PE3, the scanning line G1, G2, and G3, the signal lines S1 and S2, or the sensor wires TL1 and TL2. The sub-detection electrode CEB overlaps the widened part TCE3 and forms a slit SPA. The sub-detection electrode CEB thus can reduce a difference in visibility between the slit SPA and the slit SPB formed between the detection electrodes CE disposed side by side in the first direction X.

As described above, the detection electrode CE includes the main detection electrode CEP and the sub-detection electrodes CEA and CEB. The main detection electrode CEP has an island shape. The main detection electrodes CEP disposed side by side in the first direction X or the second direction Y are electrically coupled to each other by the sub-detection electrode CEA or CEB. As a result, the detection electrode CE can have a desired area.

In a planar view of the X-Y plane, the sensor wires TL1, TL2, and TL3 overlap the signal lines S1, S2, and S3, respectively, and extend in parallel with these signal lines.

In FIG. 8, the array substrate SUB1 includes the translucent first insulating substrate 10, such as a glass substrate and a resin substrate, serving as a base. The array substrate SUB1 includes, on one side of the first insulating substrate 10 facing the counter substrate SUB2, a first insulating film 11, a second insulating film 12, a third insulating film 13, a fourth insulating film 14, a fifth insulating film 15, a sixth insulating film 16, the signal lines S1 to S3, the pixel electrodes PE1 to PE3, the detection electrodes CE, a first orientation film AL1, and other components. In the following description, a direction from the array substrate SUB1 to the counter substrate SUB2 is referred to as an upper side.

The first insulating film 11 is positioned on the first insulating substrate 10. The second insulating film 12 is positioned on the first insulating film 11. The third insulating film 13 is positioned on the second insulating film 12. The signal lines S1 to S3 are positioned on the third insulating film 13. The fourth insulating film 14 is positioned on the third insulating film 13 and covers the signal lines S1 to S3.

The sensor wires TL1, TL2, and TL3 are positioned on the fourth insulating film 14. The sensor wires TL1, TL2, and TL3 are made of a metal material including any one of Al, Mo, and W and having lower resistance than that of the detection electrodes CE. The sensor wires TL1, TL2, and TL3 face the signal lines S1, S2, and S3, respectively, with the fourth insulating film 14 interposed therebetween. In other words, the sensor wires TL1, TL2, and TL3 overlap the signal lines S1, S2, and S3, respectively. The sensor wires TL1, TL2, and TL3 are covered with the fifth insulating film 15. The first insulating film 11, the second insulating film 12, the third insulating film 13, and the sixth insulating film 16 are made of a translucent inorganic material, such as a silicon oxide or a silicon nitride. The fourth insulating film 14 and the fifth insulating film 15 are made of a translucent resin material and have a thickness larger than that of the other insulating films made of the inorganic material. The fifth insulating film 15, however, may be made of an inorganic material.

The detection electrodes CE are positioned on the fifth insulating film 15. In FIG. 8, the detection electrode CE faces the sensor wires TL1 and TL2 with the fifth insulating film 15 interposed therebetween. In FIG. 8, the slit SPA between the detection electrodes CE is positioned right above the sensor wire TL3. The detection electrodes CE are covered with the sixth insulating film 16. The sixth insulating film 16 is made of a translucent inorganic material, such as a silicon oxide or a silicon nitride.

The pixel electrodes PE1 to PE3 are positioned on the sixth insulating film 16 and face the detection electrode CE with the sixth insulating film 16 interposed therebetween. The pixel electrodes PE1 to PE3 and the detection electrodes CE are made of a translucent conductive material, such as ITO and indium zinc oxide (IZO). The pixel electrodes PE1 to PE3 are covered with the first orientation film AL1. The first orientation film AL1 also covers the sixth insulating film 16.

The counter substrate SUB2 includes a translucent second insulating substrate 20, such as a glass substrate and a resin substrate, serving as a base. The counter substrate SUB2 includes, on one side of the second insulating substrate 20 facing the array substrate SUB1, a light-shielding layer BM, the color filters CFR, CFG, and CFB, an overcoat layer OC, a second orientation film AL2, and other components.

As illustrated in FIG. 8, the light-shielding layer BM is positioned on the one side of the second insulating substrate 20 facing the array substrate SUB1. As illustrated in FIG. 5, the light-shielding layer BM defines openings AP facing the respective pixel electrodes PE1 to PE3. The light-shielding layer BM is made of a black resin material or a light-shielding metal material.

The color filters CFR, CFG, and CFB are positioned on the one side of the second insulating substrate 20 facing the array substrate SUB1. Ends of the color filters CFR, CFG, and CFB overlap the light-shielding layer BM. The color filter CFR faces the pixel electrode PE1. The color filter CFG faces the pixel electrode PE2. The color filter CFB faces the pixel electrode PE3. The color filters CFR, CFG, and CFB are made of, for example, resin materials in red, green, and blue, respectively.

The overcoat layer OC covers the color filters CFR, CFG, and CFB. The overcoat layer OC is made of a translucent resin material. The second orientation film AL2 covers the overcoat layer OC. The first orientation film AL1 and the second orientation film AL2 are made of a horizontally oriented material, for example.

As described above, the counter substrate SUB2 includes the light-shieling layer BM, the color filters CFR, CFG, and CFB, and other components. The light-shielding layer BM is disposed in a region facing the wiring, such as the scanning lines G1, G2, and G3, the signal lines S1, S2, and S3, the contact parts PA1, PA2, and PA3, and the switching elements TrD1, TrD2, and TrD3 illustrated in FIG. 4.

While the counter substrate SUB2 includes the color filters CFR, CFG, and CFB in three colors in FIG. 8, it may include color filters in four or more colors different from blue, red, and green, such as white, transparent color, yellow, magenta, and cyan. The color filters CFR, CFG, and CFB may be provided to the array substrate SUB1.

The array substrate SUB1 and the counter substrate SUB2 are respectively provided with the first orientation film AL1 and the second orientation film AL2 so that they face each other. The liquid crystal layer LC is sealed between the first orientation film AL1 and the second orientation film AL2. The liquid crystal layer LC is made of a negative liquid crystal material having negative dielectric anisotropy or a positive liquid crystal material having positive dielectric anisotropy.

The array substrate SUB1 faces a backlight unit IL, and the counter substrate SUB2 is positioned close to the display surface. The backlight unit IL may have various kinds of forms, and detailed explanation of the configuration of the backlight unit IL is omitted.

A first optical element OD1 including a first polarizing plate PL1 is disposed on an outer surface of the first insulating substrate 10 or a surface facing the backlight unit IL. A second optical element OD2 including a second polarizing plate PL2 is disposed on an outer surface of the second insulating substrate 20 or a surface at a position of observation. A first polarization axis of the first polarizing plate PL1 and a second polarization axis of the second polarizing plate PL2 are, for example, in a cross-Nicol positional relation on the X-Y plane. The first optical element OD1 and the second optical element OD2 may include other optical functional elements, such as a phase difference plate.

Assume a case where the liquid crystal layer LC is made of a negative liquid crystal material. When no voltage is applied to the liquid crystal layer LC, liquid crystal molecules LM are initially oriented with their long axes extending along the first direction X on the X-Y plane. By contrast, when a voltage is applied to the liquid crystal layer LC, that is, in an on-state when an electric field is formed between the pixel electrodes PE1 to PE3 and the respective detection electrodes CE, the orientation state of the liquid crystal molecules LM changes due to the effects of the electric field. In the on-state, the polarization state of incident linearly polarized light changes according to the orientation state of the liquid crystal molecules LM when passing through the liquid crystal layer LC.

The following describes the configuration of the switching elements TrD1, TrD2, and TrD3 illustrated in FIG. 6 in greater detail. While the switching elements TrD1, TrD2, and TrD3 described below are top-gate type elements, they may be bottom-gate type elements. FIG. 6 illustrates only major parts required for the explanation of the switching elements TrD1, TrD2, and TrD3 and does not illustrate the detection electrodes CE, the pixel electrodes PE1 to PE3, the sensor wires TL1 to TL3, or other components.

The switching elements TrD1, TrD2, and TrD3 are disposed side by side in the first direction X. The switching element TrD1 includes a light-shielding body SL1, a semiconductor layer SC1, and a relay electrode RE1. The switching element TrD2 includes a light-shielding body SL2, a semiconductor layer SC2, and a relay electrode RE2. The switching element TrD3 includes a light-shielding body SL3, a semiconductor layer SC3, and a relay electrode RE3. The semiconductor layers SC1 to SC3 each have a substantially U-shape and intersect the scanning line G2 at two positions.

In the switching element TrD1, the semiconductor layer SC1 has an end E11 and an end E12. The end E11 is electrically coupled to the signal line S1 via a contact hole CH11. The end E12 is electrically coupled to the relay electrode RE1 via a contact hole CH12. The relay electrode RE1 is positioned between the signal line for the adjacent pixel and the signal line S1. The relay electrode RE1 and the ends E11 and E12 are positioned closer to the scanning line G1 with respect to the scanning line G2.

The two parts of the scanning line G2 intersecting the semiconductor layer SC1 serve as gate electrodes WG11 and WG12, respectively. The light-shielding body SL1 is positioned immediately below the part of the semiconductor layer SC1 intersecting the gate electrode WG12 in a planar view of the X-Y plane.

In the switching element TrD2, the semiconductor layer SC2 has an end E21 and an end E22. The end E21 is electrically coupled to the signal line S2 via a contact hole CH21. The end E22 is electrically coupled to the relay electrode RE2 via a contact hole CH22. The relay electrode RE2 is positioned between the signal line S1 and the signal line S2. The relay electrode RE2 and the ends E21 and E22 are positioned closer to the scanning line G1 with respect to the scanning line G2.

The two parts of the scanning line G2 intersecting the semiconductor layer SC2 serve as gate electrodes WG21 and WG22, respectively. The light-shielding body SL2 is positioned immediately below the part of the semiconductor layer SC2 intersecting the gate electrode WG22 in a planar view of the X-Y plane.

In the switching element TrD3, the semiconductor layer SC3 has an end E31 and an end E32. The end E31 is electrically coupled to the signal line S3 via a contact hole CH31. The end E32 is electrically coupled to the relay electrode RE3 via a contact hole CH32. The relay electrode RE3 is positioned between the signal line S2 and the signal line S3. The relay electrode RE3 and the ends E31 and E32 are positioned closer to the scanning line G1 with respect to the scanning line G2.

The two parts of the scanning line G2 intersecting the semiconductor layer SC3 serve as gate electrodes WG31 and WG32, respectively. The light-shielding body SL3 is positioned immediately below the part of the semiconductor layer SC3 intersecting the gate electrode WG32 in a planar view of the X-Y plane.

As illustrated in FIG. 7, the contact part PA1 of the pixel electrode PE1 faces the relay electrode RE1 and is electrically coupled to the relay electrode RE1 via the contact hole CH12. The contact part PA2 of the pixel electrode PE2 faces the relay electrode RE2 and is electrically coupled to the relay electrode RE2 via the contact hole CH22. The contact part PA3 of the pixel electrode PE3 faces the relay electrode RE3 and is electrically coupled to the relay electrode RE3 via the contact hole CH32. FIG. 7 illustrates only the configuration below the first orientation film AL1 and above the second insulating film 12 illustrated in FIG. 8.

The contact parts PA1, PA2, and PA3 are respectively electrically coupled to the relay electrodes RE1, RE2, and RE3, with respective conductive layers CEE interposed therebetween. The conductive layers CEE are electrically insulated from one another at the outside of the contact holes CH12, CH22, and CH32 by the fifth insulating film 15 and the sixth insulating film 16. The conductive layers CEE are formed simultaneously with the detection electrodes CE and made of the same material as that of the detection electrodes CE.

The relay electrodes RE1, RE2, and RE3 are formed simultaneously with the sensor wires TL1, TL2, and TL3 and made of the same material as that of the sensor wires TL1, TL2, and TL3. The relay electrodes RE1, RE2, and RE3 are formed on drain electrodes DE12, DE22, and DE32, respectively, and electrically coupled thereto. The drain electrodes DE12, DE22, and DE32 are coupled to the ends E12, E22, and E32 of the switching elements TrD1, TrD2, and TrD3, respectively, illustrated in FIG. 6. The drain electrodes DE12, DE22, and DE32 are formed simultaneously with the signal lines S1, S2, and S3 and made of the same material as that of the signal lines S1, S2, and S3.

The light-shielding bodies SL1, SL2, and SL3 (refer to FIG. 6) are disposed at positions not illustrated in FIG. 7 or 8. The light-shielding bodies SL1, SL2, and SL3 are positioned between the first insulating substrate 10 and the first insulating film 11 illustrated in FIG. 8. As illustrated in FIGS. 10 to 12, the semiconductor layers SC1, SC2, and SC3 are positioned between the first insulating film 11 and the second insulating film 12. While the semiconductor layers SC1, SC2, and SC3 are made of polycrystalline silicon, for example, they may be made of amorphous silicon or an oxide semiconductor, for example.

As illustrated in FIG. 7, the relay electrodes RE1 to RE3 are positioned on a straight line extending along the first direction X. Trying to couple the sub-detection electrode CEA to the sensor wire TL2 in the section illustrated in FIG. 7 requires another contact hole between the contact hole CH12 and the contact hole CH22 in the first direction X. If another contact hole is formed between the contact hole CH12 and the contact hole CH22 in the first direction X, it is necessary to increase the distance between the contact hole CH12 and the contact hole CH22 to maintain the thickness of the fifth insulating film 15. As a result, the width of the sub-pixel SPix in the first direction X increases. To address this, in the first embodiment, an electrical coupling point between the detection electrode CE and any one of the sensor wires TL1, TL2, and TL3 is disposed at a position not aligning with the contact holes CH12, CH22, and CH32.

As illustrated in FIG. 4, the detection electrodes CE and the sensor wires TL1, TL2, and TL3 are electrically coupled at respective widened parts TCE1, TCE2, and TCE3, which are part of the sensor wires TL1, TL2, and TL3. As illustrated in FIGS. 4 and 6, the widened parts TCE1, TCE2, and TCE3 are disposed at positions not aligning with the contact holes CH12, CH22, and CH32. Accordingly, in the section illustrated in FIG. 7, the sub-detection electrode CEA is electrically insulated from the sensor wire TL2 by the fifth insulating film 15. That is, the sub-detection electrode CEA that couples the main detection electrodes CEP disposed side by side in the second direction Y is disposed at a position overlapping the sensor wire TL2. This configuration can maintain the thickness of the fifth insulating film 15 and reduce the width of the sub-pixel SPix in the first direction X. As a result, the display device PNL with a sensor according to the first embodiment can have higher resolution.

As illustrated in FIG. 8, the width of main lines ML (refer to FIG. 4) of the sensor wires TL1, TL2, and TL3 in the first direction X is equal to or smaller than that of the light-shielding layer BM. This structure makes the main lines ML of the sensor wires TL1, TL2, and TL3 less likely to be visually recognized.

As illustrated in FIG. 5, the width of the widened parts TCE1, TCE2, and TCE3 is larger than that of the main lines ML of the sensor wires TL1, TL2, and TL3 in the first direction X. In FIG. 5, the light-shielding layer BM has a plurality of first parts BM1 extending in the first direction X and a plurality of second parts BM2 extending in the second direction Y. The light-shielding layer BM surrounds the openings AP of the sub-pixels SPix in a planar view of the X-Y plane. With this structure, at least a part of the widened parts TCE1, TCE2, and TCE3 overlaps the second part BM2, and the other part thereof protrudes from the second part BM2, in a planar view of the X-Y plane. In other words, as illustrated in FIG. 5, the width of the widened parts TCE1, TCE2, and TCE3 is larger than that of the second part BM2 of the light-shielding layer BM in the first direction X.

In the display device PNL with a sensor according to the first embodiment, as illustrated in FIG. 9 or 13, a pixel having the widened parts TCE1, TCE2, and TCE3 serves as a pixel Pix (first pixel) including the coupling part CT (refer to FIGS. 10 to 12). By contrast, in the display device PNL with a sensor according to the first embodiment, a pixel not having the widened parts TCE1, TCE2, and TCE3 serves as a pixel Pix (second pixel) not including the coupling part CT. The pixel Pix (first pixel) including the coupling part CT (refer to FIGS. 10 to 12) and the pixel Pix (second pixel) not including the coupling part CT are alternately disposed in the first direction X. The pixel Pix including the coupling part CT and the pixel Pix not including the coupling part CT are alternately disposed in the second direction Y. As described above, a non-coupling region PTN not having the widened parts TCE1, TCE2, and TCE3 is arranged in every other pixel Pix, thereby reducing the amount of shielded light due to the effects of the widened parts TCE1, TCE2, and TCE3.

As illustrated in FIG. 9, in a first pattern CB1, first coupling regions PT1, second coupling regions PT2, third coupling regions PT3, and the non-coupling regions PTN are disposed in 6×6 pixels Pix. In the first coupling regions PT1, the second coupling regions PT2, and the third coupling regions PT3, the pixel Pix has the widened parts TCE1, TCE2, and TCE3 in the respective sub-pixels SPix. In the first coupling region PT1, the widened part TCE1 is electrically coupled to the detection electrode CE via the contact hole TH. Accordingly, as illustrated in FIG. 10, the widened part TCE1 is coupled to the detection electrode CE as the coupling part CT. In the first coupling region PT1, the widened parts TCE2 and TCE3 are not coupled to the detection electrode CE. In the second coupling region PT2, the widened part TCE2 is electrically coupled to the detection electrode CE via the contact hole TH. Accordingly, as illustrated in FIG. 11, the widened part TCE2 is coupled to the detection electrode CE as the coupling part CT. In the second coupling region PT2, the widened parts TCE1 and TCE3 are not coupled to the detection electrode CE. In the third coupling region PT3, the widened part TCE3 is electrically coupled to the detection electrode CE via the contact hole TH. Accordingly, as illustrated in FIG. 12, the widened part TCE3 is coupled to the detection electrode CE as the coupling part CT. In the third coupling region PT3, the widened parts TCE1 and TCE2 are not coupled to the detection electrode CE.

As illustrated in FIG. 9, the pixel Pix (first pixel) having the widened parts TCE1, TCE2, and TCE3 includes the sub-pixels Spix1, Spix2, and Spix3. Similarly, the pixel Pix (second pixel) not having the widened parts TCE1, TCE2, and TCE3 includes the sub-pixels Spix1, Spix2, and Spix3. Three pixels Pix (first pixels) each having the widened parts TCE1, TCE2, and TCE3 are disposed side by side in the second direction Y with the pixel Pix (second pixel) not having the widened parts TCE1, TCE2, and TCE3 interposed between adjacent pixels Pix of the three pixels Pix. In one of the three pixels Pix (first pixels) having the widened parts TCE1, TCE2, and TCE3, the widened part TCE1 of the sub-pixel SPix1 is coupled to the detection electrode CE via the contact hole TH in the first coupling region PT1. Similarly, in one of the three pixels Pix (first pixels) having the widened parts TCE1, TCE2, and TCE3, the widened part TCE2 of the sub-pixel SPix2 is coupled to the detection electrode CE via the contact hole TH in the second coupling region PT2. Accordingly, as illustrated in FIG. 11, the widened part TCE2 is coupled to the detection electrode CE as the coupling part CT. In one of the three pixels Pix (first pixels) having the widened parts TCE1, TCE2, and TCE3, the widened part TCE3 of the sub-pixel SPix3 is coupled to the detection electrode CE via the contact hole TH in the third coupling region PT3.

Three pixels Pix (first pixels) each having the widened parts TCE1, TCE2, and TCE3 are disposed side by side in the first direction X with the pixel Pix (second pixel) not having the widened parts TCE1, TCE2, and TCE3 interposed between adjacent pixels Pix of the three pixels Pix. In one of the three pixels Pix (first pixels) having the widened parts TCE1, TCE2, and TCE3, the widened part TCE1 of the sub-pixel SPix1 is coupled to the detection electrode CE via the contact hole TH in the first coupling region PT1. Similarly, in one of the three pixels Pix (first pixels) having the widened parts TCE1, TCE2, and TCE3, the widened part TCE2 of the sub-pixel SPix2 is coupled to the detection electrode CE via the contact hole TH in the second coupling region PT2. In one of the three pixels Pix (first pixels) having the widened parts TCE1, TCE2, and TCE3, the widened part TCE3 of the sub-pixel SPix3 is coupled to the detection electrode CE via the contact hole TH in the third coupling region PT3.

With this configuration, the positions of the contact holes TH are evenly dispersed, thereby making distortion of the first orientation film AL1 due to the effects of the contact holes TH less noticeable. As a result, the display quality is less likely to deteriorate.

In each of the first coupling regions PT1, the second coupling regions PT2, and the third coupling regions PT3, the sub-pixels SPix1, SPix2, and SPix3 have the widened parts TCE1, TCE2, and TCE3, respectively. With this configuration, the widened parts TCE1, TCE2, and TCE3 affect the sub-pixels SPix1, SPix2, and SPix3, respectively, thereby reducing fluctuations in light shielding.

As illustrated in FIG. 10, the widened part TCE1 and the detection electrode CE are electrically coupled to each other via the contact hole TH. At the coupling part CT, the widened part TCE1 is directly in contact with the detection electrode CE. Alternatively, at the coupling part CT, another conductive layer may be interposed between the widened part TCE1 and the detection electrode CE. The widened part TCE2 and the detection electrode CE are not electrically coupled to each other in the X-X' section in FIG. 9. The widened part TCE3 and the detection electrode CE are not electrically coupled to each other in the X-X' section in FIG. 9.

As illustrated in FIG. 11, the widened part TCE2 and the detection electrode CE are electrically coupled to each other in the contact hole TH. At the coupling part CT, the widened part TCE2 is directly in contact with the detection electrode CE. Alternatively, at the coupling part CT, another conductive layer may be interposed between the widened part TCE2 and the detection electrode CE. The widened part TCE1 and the detection electrode CE are not electrically coupled to each other in the XI-XI' section in FIG. 9. The widened part TCE3 and the detection electrode CE are not electrically coupled to each other in the XI-XI' section in FIG. 9.

As illustrated in FIG. 12, the widened part TCE3 and the detection electrode CE are electrically coupled to each other in the contact hole TH. At the coupling part CT, the widened part TCE3 is directly in contact with the detection electrode CE. Alternatively, at the coupling part CT, another conductive layer may be interposed between the widened part TCE3 and the detection electrode CE. The widened part TCE1 and the detection electrode CE are not electrically coupled to each other in the XII-XII' section in FIG. 9. The widened part TCE2 and the detection electrode CE are not electrically coupled to each other in the XII-XII' section in FIG. 9.

As illustrated in FIG. 9, in each of the first coupling region PT1, the second coupling region PT2, and the third coupling region PT3, one of the widened parts TCE1, TCE2, and TCE3 is coupled to the detection electrode CE, and the other two of them are not coupled to the detection electrode CE. In the first pattern CB1, one first coupling region PT1, one second coupling region PT2, and one third coupling region PT3 are disposed in the first direction X in the 6×6 pixels Pix. One first coupling region PT1, one second coupling region PT2, and one third coupling region PT3 are disposed in the second direction Y in the 6×6 pixels Pix.

As illustrated in FIG. 13, in a second pattern CB2, the second coupling regions PT2 and the non-coupling regions PTN are disposed in the 6×6 pixels Pix. In the second coupling region PT2, the widened part TCE2 is electrically coupled to the detection electrode CE via the contact hole TH.

The first pattern CB1 illustrated in FIG. 9 and the second pattern CB2 illustrated in FIG. 13 have the same number of widened parts TCE1, TCE2, and TCE3 in the 6×6 pixels Pix. This configuration makes the first pattern CB1 illustrated in FIG. 9 and the second pattern CB2 illustrated in FIG. 13 less likely to be distinguished from each other.

The display device PNL with a sensor according to the first embodiment has the first pattern CB1 illustrated in FIG. 9 and the second pattern CB2 illustrated in FIG. 13 in a mixed manner. For conceptual explanation of the detection electrodes CE illustrated in FIG. 2, FIG. 14 representatively illustrates the detection electrodes CE in one column and four rows in the second direction Y. The following describes four detection electrodes CE1, CE2, CE3, and CE4 with reference to FIG. 14. In an actual configuration, the detection electrodes CE are arrayed in a matrix (row-column configuration) as illustrated in FIG. 2 using the technical idea described below. While FIG. 14 illustrates the sensor wires TL1, TL2, and TL3 as straight lines extending along the second direction Y, they actually extend in a zigzag shape along the directions D1 and D2 as described above.

In the second direction Y, the detection electrodes CE1, CE2, CE3, and CE4 are sequentially disposed so that the detection electrode CE1 is the farthest from the coupling circuit MP. In the detection electrode CE1, the first patterns CB1 are arrayed in four columns and two rows. The sensor wires TL1, TL2, and TL3 are electrically coupled to the detection electrode CE1 via the contact holes TH. In the first patterns CB1 in the first column from the left, the sensor wires TL1 and TL3 coupled to the coupling circuit MP are electrically coupled to the detection electrode CE1 via the contact holes TH. In the first patterns CB1 from the second column to the fourth column from the left, the sensor wires TL1 and TL3 are electrically decoupled by a slit SP1 between the detection electrode CE1 and the detection electrode CE2.

In the detection electrode CE2, the second patterns CB2 are arrayed in one column and two rows from the left, and the first patterns CB1 are arrayed in three columns and two rows from the second column from the left. The sensor wires TL1, TL2, and TL3 are electrically coupled to the detection electrode CE2 via the contact holes TH. In the first patterns CB1 in the second column from the left, the sensor wires TL1 and TL3 coupled to the coupling circuit MP are electrically coupled to the detection electrode CE2 via the contact holes TH. The sensor wires TL2 are electrically decoupled by a slit SP2 between the detection electrode CE2 and the detection electrode CE3. In the first patterns CB1 in the third and the fourth columns from the left, the sensor wires TL1 and TL3 are electrically decoupled by the slit SP2 between the detection electrode CE2 and the detection electrode CE3.

In the detection electrode CE3, the second patterns CB2 are arrayed in two columns and two rows from the left, and the first patterns CB1 are arrayed in two columns and two rows from the third column from the left. The sensor wires TL1, TL2, and TL3 are electrically coupled to the detection electrode CE3 via the contact holes TH. In the first patterns CB1 in the third column from the left, the sensor wires TL1 and TL3 coupled to the coupling circuit MP are electrically coupled to the detection electrode CE3 via the contact holes TH. The sensor wires TL2 are electrically decoupled by a slit SP3 between the detection electrode CE3 and the detection electrode CE4. In the first patterns CB1 in the fourth column from the left, the sensor wires TL1 and TL3 are electrically decoupled by the slit SP3 between the detection electrode CE3 and the detection electrode CE4.

In the detection electrode CE4, the second patterns CB2 are arrayed in three columns and two rows from the left, and the first patterns CB1 are arrayed in one column and two rows from the fourth column from the left. The sensor wires TL1, TL2, and TL3 are electrically coupled to the detection electrode CE4 via the contact holes TH. In the first patterns CB1 in the fourth column from the left, the sensor wires TL1 and TL3 coupled to the coupling circuit MP are electrically coupled to the detection electrode CE4 via the contact holes TH. The sensor wires TL2 are not coupled to supply wiring from the coupling circuit MP and are electrically decoupled from the wiring from the coupling circuit MP.

In the second patterns CB2 in the first column from the left, the sensor wires TL1 and TL3 coupled to the coupling circuit MP overlap the detection electrodes CE4, CE3, and CE2 but are not electrically coupled thereto. In the second patterns CB2 in the first column from the left, the sensor wires TL1 and TL3 coupled to the coupling circuit MP extend across the slits SP3, SP2, and SP1.

In the second patterns CB2 in the second column from the left, the sensor wires TL1 and TL3 coupled to the coupling circuit MP overlap the detection electrodes CE4 and CE3 but are not electrically coupled thereto. In the second patterns CB2 in the second column from the left, the sensor wires TL1 and TL3 coupled to the coupling circuit MP extend across the slits SP3 and SP2.

In the second patterns CB2 in the third column from the left, the sensor wires TL1 and TL3 coupled to the coupling circuit MP overlap the detection electrode CE4 but are not electrically coupled thereto. In the second patterns CB2 in the third column from the left, the sensor wires TL1 and TL3 coupled to the coupling circuit MP extend across the slit SP3.

As described above, the sensor wires TL2 are electrically decoupled by any one of the slits SP1, SP2, and SP3 between the detection electrodes disposed side by side. This structure reduces parasitic capacitance generated between the detection electrodes CE and the sensor wires TL2 and improves accuracy in detecting capacitance.

As illustrated in FIG. 13, in the second pattern CB2, the pixel Pix (first pixel) having the widened parts TCE1, TCE2, and TCE3 includes the sub-pixels Spix1, Spix2, and Spix3. Similarly, the pixel Pix (second pixel) not having the widened parts TCE1, TCE2, and TCE3 includes the sub-pixels Spix1, Spix2, and Spix3. Three pixels Pix (first pixels) each having the widened parts TCE1, TCE2, and TCE3 are disposed side by side in the second direction Y with the pixel Pix (second pixels) not having the widened parts TCE1, TCE2, and TCE3 interposed between adjacent pixels Pix of the three pixels Pix. In the three pixels Pix (first pixels) each having the widened parts TCE1, TCE2, and TCE3, the widened part TCE2 of the sub-pixel SPix2 is coupled to the detection electrode CE via the contact hole TH.

In the second pattern CB2, three pixels Pix (first pixels) each having the coupling part CT are disposed side by side in the first direction X with the pixel Pix (second pixel) not having the coupling part CT interposed between adjacent pixels Pix of the three pixels Pix. In the pixel Pix (first pixel) having the coupling part CT, the widened part TCE2 of the sub-pixel SPix2 is coupled to the detection electrode CE as the coupling part CT (refer to FIG. 11).

With this configuration, the sensor wires TL1 each having the widened part TCE1 in the sub-pixel SPix1 can extend across the detection electrodes CE4, CE3, and CE2, for example. Similarly, the sensor wires TL3 each having the widened part TCE3 in the sub-pixel SPix3 can extend across the detection electrodes CE4, CE3, and CE2, for example. The sensor wires TL2 are electrically decoupled by any one of the slits SP1, SP2, and SP3. This structure reduces parasitic capacitance generated between the detection electrodes CE and the sensor wires TL2 and improves accuracy in detecting capacitance.

In comparison between the detection electrodes CE1 and CE2 disposed side by side, the number of couplings via the contact holes TH is equal per unit area of 6×6 pixels Pix. In comparison between the detection electrodes CE2 and CE3 disposed side by side, the number of couplings via the contact holes TH is equal per unit area of 6×6 pixels Pix. In comparison between the detection electrodes CE3 and CE4 disposed side by side, the number of couplings via the contact holes TH is equal per unit area of 6×6 pixels Pix. This configuration makes the contact holes TH less noticeable. Consequently, the display device PNL with a sensor can provide higher display quality.

Figure 15:
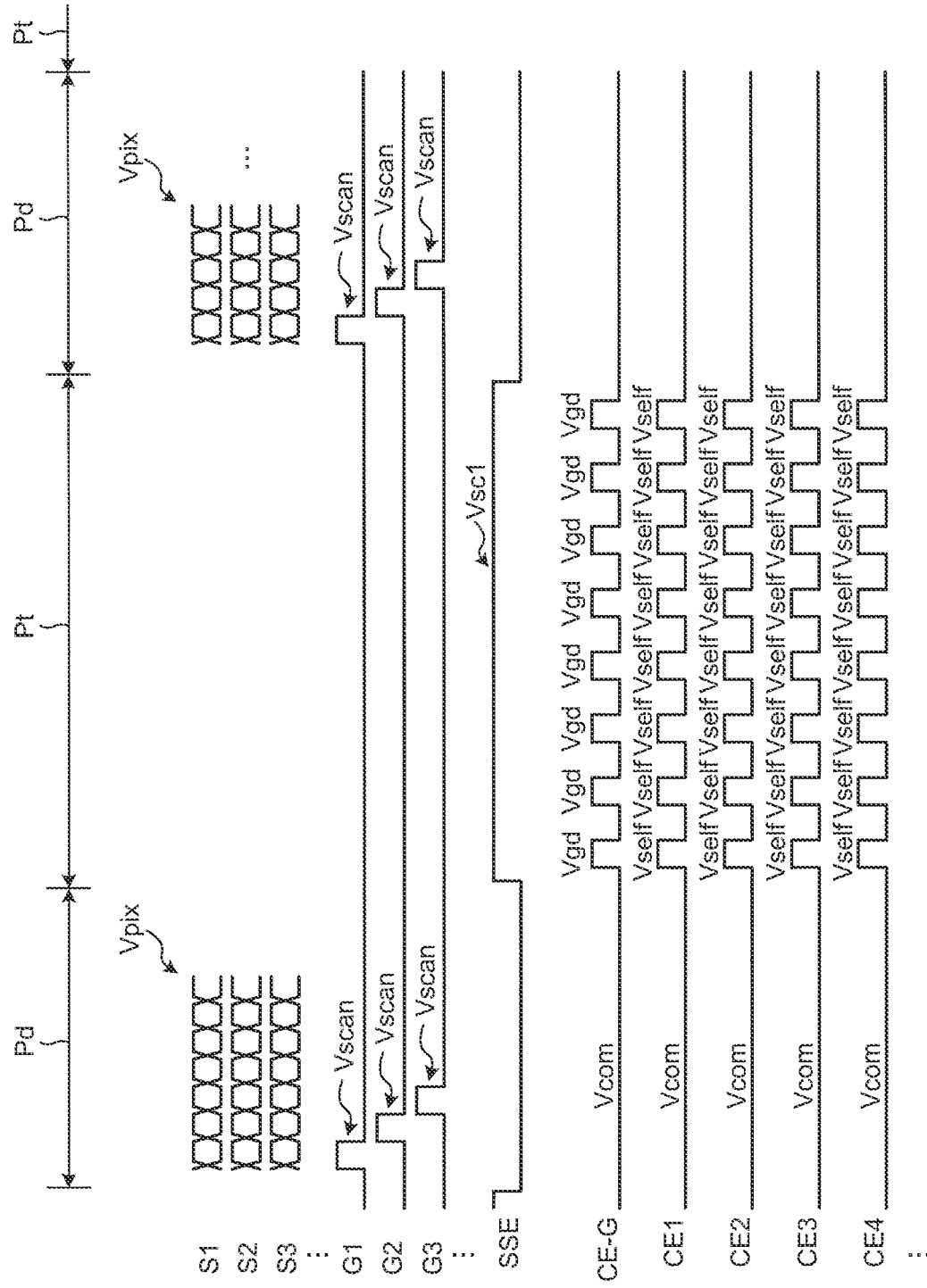
FIG. 15 is a timing waveform chart of an exemplary operation performed by the display device according to the first embodiment.

FIG. 15 is a timing waveform chart of an exemplary operation performed by the display device according to the first embodiment. The exemplary operation illustrated in FIG. 15 is given by way of example only and may be appropriately modified.

As illustrated in FIG. 15, a display period Pd and a detection period Pt are alternately performed in a time-division manner. The display device PNL with a sensor may perform touch detection on one detection surface in one detection period Pt or a plurality of detection periods Pt in a divided manner. The display device PNL with a sensor may display an image of one frame in one display period Pd or alternately perform the display period Pd and the detection period Pt multiple times in a period for displaying an image of one frame.

A source driver supplies the pixel signals Vpix to the sub-pixels SPix1, SPix2, and SPix3 corresponding to the scanning lines G1, G2, and G3 via the signal lines S1, S2, and S3. The sub-pixels SPix1, SPix2, and SPix3 perform display in units of one horizontal line in accordance with the supplied pixel signals Vpix. As illustrated in FIG. 15, display drive signals Vcom are supplied to the detection electrodes CE1, CE2, CE3, and CE4 in the display period Pd. The coupling circuit MP supplies the display drive signals Vcom to all the detection electrodes CE (refer to FIG. 2). Accordingly, the detection electrodes CE serve as common electrodes that supply a common potential.

As illustrated in FIG. 15, in the detection period Pt, the integrated circuit CP and the coupling circuit MP operate in accordance with a control signal Vsc1 supplied from a control line SSE, which is not illustrated, and supply detection drive signals Vself to the detection electrodes CE. In the detection period Pt, the outer edge wiring CE-G illustrated in FIG. 1 may be supplied with guard signals Vgd having the same waveform as that of the detection drive signals Vself and synchronized with the drive signals Vself. Alternatively, the outer edge wiring CE-G may be brought into a state of not being electrically coupled to any component (high impedance).

Detection signals Vdet corresponding to capacitance changes in the detection electrodes CE are supplied to a detection circuit of the integrated circuit CP via the analog front ends of the coupling circuit MP. The display device PNL with a sensor thus can detect a target object in a contact state or a proximity state in units of a plurality of detection electrodes CE. Because the specific detection method is described in JP-A-2015-143933, explanation of the detection method is omitted herein by mentioning JP-A-2015-143933 in the present embodiment.

As described above, the display device PNL with a sensor includes the detection electrodes CE, the sensor wires TL, the pixels Pix, the scanning lines GL, and the signal lines SL on the first insulating substrate 10. The detection electrodes CE are arrayed in a matrix (row-column configuration) in the first direction X and the second direction Y intersecting the first direction X. A plurality of sensor wires TL are coupled to one detection electrode CE. The pixels Pix each include the sub-pixels SPix1, SPix2, and SPix3. The scanning lines GL scan the switching elements TrD1, TrD2, and TrD3 and extend in the first direction X. The signal lines SL are coupled to the respective switching elements TrD1, TrD2, and TrD3 and extend in the second direction Y. In the third direction Z, one sensor wire TL is disposed above and overlaps one signal line SL. With this configuration, the sensor wires TL also overlap the light-shielding layer BM overlapping the signal lines SL and are made less noticeable.

As described above, a plurality of sensor wires TL are electrically coupled to one detection electrode CE. This configuration can reduce wiring resistance, thereby suppressing waveform degradation in the drive signals supplied to the detection electrodes CE. Consequently, the display device PNL with a sensor can detect the capacitance with higher accuracy.

Because the sensor wire TL overlaps the signal line SL, the width of the sensor wire TL in the first direction X is larger than that of the signal line SL. This structure facilitates alignment at the time of film formation, and can reduce resistance of the sensor wires TL. The width of the main line ML of the sensor wire TL in the first direction X is preferably equal to or smaller than that of the light-shielding layer BM overlapping the sensor wire TL. This structure makes the sensor wires TL less likely to be visually recognized.

The sensor wire TL has, at a part thereof, any one of the widened parts TCE1 to TCE3 having the width in the first direction X larger than that of the main line. With the widened parts TCE1, TCE2, and TCE3 having a sufficiently large width, a contact area between any one of the widened parts TCE1, TCE2, and TCE3 and the detection electrode CE can be secured by forming the contact hole TH even if the thickness of the fifth insulating film 15 increases. As described above, the fifth insulating film 15 has the contact holes TH, each of which has the coupling part CT at which the detection electrode CE and any one of the widened parts TCE1, TCE2, and TCE3 are coupled to each other. This configuration can secure the distance between the sensor wires TL1, TL2, and TL3 and the detection electrode CE in the third direction Z, thereby reducing parasitic capacitance generated between the detection electrode CE and the sensor wires TL1, TL2, and TL3 passing over the detection electrode CE. With the widened part TCE1 having a sufficiently large width, the fifth insulating film 15 can be made of a resin material, which is hard to be formed as a thin film.

The detection electrode CE is disposed on the upper side than the sensor wires TL with the fifth insulating film 15 interposed therebetween in the third direction Z. The fifth insulating film 15 has the contact holes TH, via which the detection electrode CE and any one of the widened parts TCE1, TCE2, and TCE3 are coupled to each other. The widened parts TCE1, TCE2, and TCE3 are disposed above and overlap the signal lines SL. With this configuration, distortion of the first orientation film AL1 due to the effects of the contact holes TH is less likely to affect the pixel electrodes PE1, PE2, and PE3. As a result, the display quality is less likely to deteriorate.

As illustrated in FIG. 14, a plurality of contact holes TH are formed between one detection electrode CE1 and one sensor wire TL1, for example. This configuration can reduce coupling resistance, thereby suppressing waveform degradation in the drive signals supplied to the detection electrodes CE. Consequently, the display device PNL with a sensor can detect the capacitance with higher accuracy.

As illustrated in FIG. 5, the widened parts TCE1, TCE2, and TCE3 are disposed between two scanning lines G1 and G2 disposed side by side. In a planar view of the X-Y plane, none of the widened parts TCE1, TCE2, and TCE3 overlaps the first part BM1. With this configuration, the positions of the widened parts TCE1, TCE2, and TCE3 are made different from those of the contact parts PA1, PA2, and PA3 of the pixel electrodes PE1, PE2, and PE3, respectively, illustrated in FIG. 5. The configuration can increase accuracy in forming the contact holes TH as illustrated in FIG. 14, thereby increasing reliability in electrical coupling between the detection electrodes CE and the sensor wires TL.

As illustrated in FIGS. 10 to 12, the widened parts TCE1, TCE2, and TCE3 are disposed above and overlap any one of the contact holes CH11, CH21, and CH31 illustrated in FIG. 6. With this configuration, the widened parts TCE1, TCE2, and TCE3 can reduce the effects of the contact holes CH11, CH21, and CH31 on the first orientation film AL1.

Second Embodiment

Figure 16:
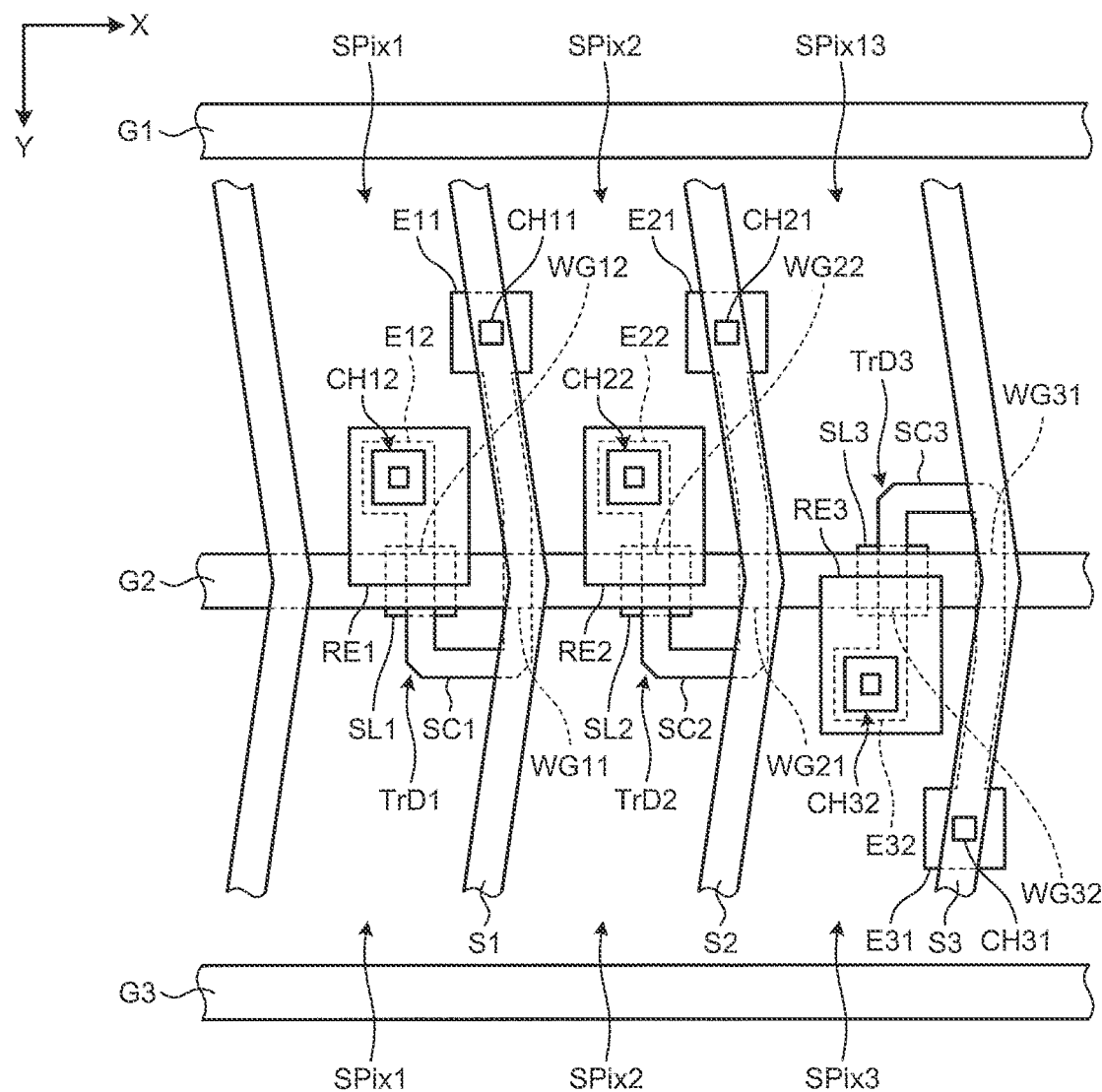
FIG. 16 is a plan view for explaining the switching elements according to a second embodiment.
Figure 17:
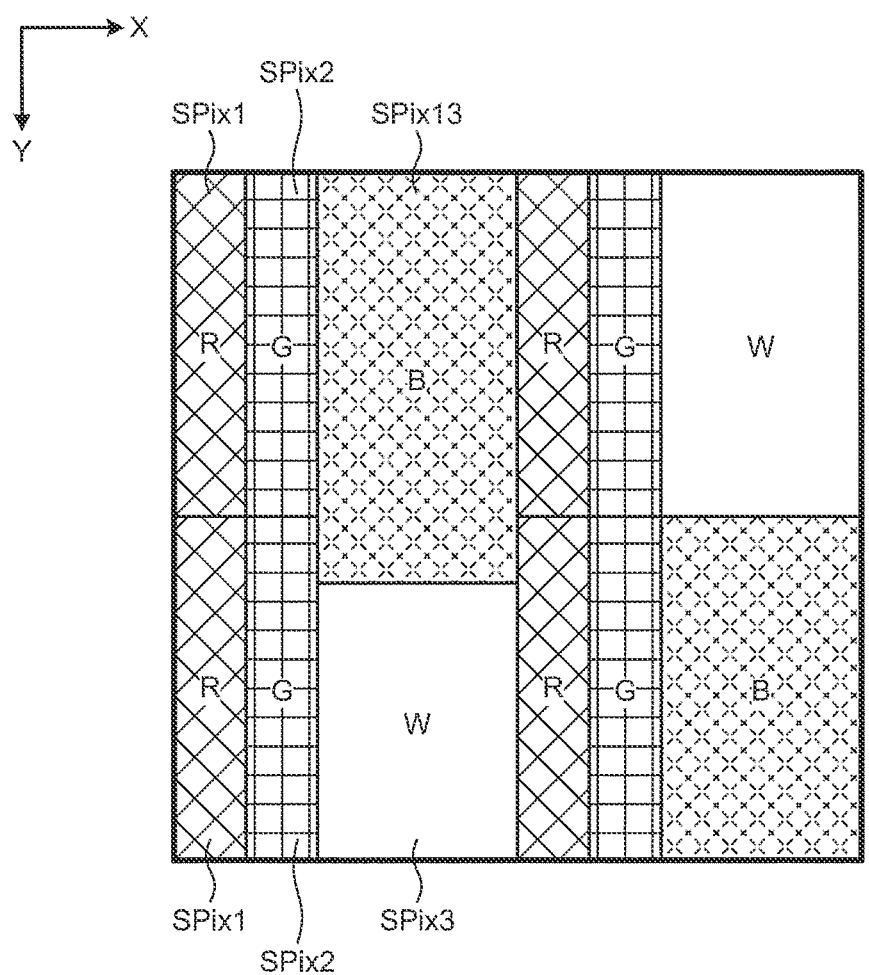
FIG. 17 is a schematic diagram for explaining sub-pixels according to the second embodiment.

FIG. 16 is a plan view for explaining the switching elements according to a second embodiment. FIG. 17 is a schematic diagram for explaining the sub-pixels according to the second embodiment. Components described in the first embodiment are denoted by like reference numerals, and explanation thereof is omitted. The second embodiment is different from the first embodiment in the configuration of a sub-pixel SPix13.

In the switching element TrD3 according to the second embodiment, the semiconductor layer SC3 has the end E31 and the end E32. The end E31 is electrically coupled to the signal line S3 via the contact hole CH31. The end E32 is electrically coupled to the relay electrode RE3 via the contact hole CH32. The relay electrode RE3 is positioned between the signal line S2 and the signal line S3. The relay electrode RE3 and the ends E31 and E32 are positioned closer to the scanning line G3 with respect to the scanning line G2.

The two parts of the scanning line G2 intersecting the semiconductor layer SC3 serve as the respective gate electrodes WG31 and WG32. The light-shielding body SL3 is positioned immediately below the part of the semiconductor layer SC3 intersecting the gate electrode WG32. The relay electrode RE3 is shifted to the opposite side of the scanning line G2 with respect to the position where the relay electrodes RE1 and RE2 are disposed side by side. While the relay electrodes RE1 to RE3 partially overlap the scanning line G2, the entirety of the relay electrodes RE1 to RE3 may be separated from the positions overlapping the scanning line G2.

The contact holes CH12 and CH22 are formed side by side on a straight line extending along the first direction X. By contrast, the contact hole CH32 is positioned in an oblique direction intersecting the first direction X with respect to the contact holes CH12 and CH22. In other words, the contact hole CH32 is formed at a position deviated from the straight line on which the contact holes CH12 and CH22 are formed side by side. The widened parts TCE1, TCE2, and TCE3 are disposed above and overlap any one of the contact holes CH11, CH21, and CH31 illustrated in FIG. 16. As a result, as illustrated in FIG. 14, the contact holes TH can be formed more precisely, thereby increasing reliability of electrically coupling between the detection electrodes CE and the sensor wires TL.

As illustrated in FIG. 17, the sub-pixels SPix1 are arrayed along the second direction Y in the first column. The sub-pixels SPix2 are arrayed along the second direction Y in the second column next to the first column. The sub-pixel SPix3 and the sub-pixel SPix13 are alternately arrayed along the second direction Y in the third column next to the second column. The first column, the second column, and the third column are cyclically arrayed in the first direction X. The sub-pixels SPix1 are provided with the color filter of red (R). The sub-pixels SPix2 are provided with the color filter of green (G). The sub-pixels SPix3 are provided with the color filter of white or transparent (W). The sub-pixels SPix13 are provided with the color filter of blue (B).

The configuration can reduce a current value of the backlight unit IL by the increased luminance by the sub-pixel SPix 13, thereby reducing power consumption. Further, the configuration can secure the area of blue (B) having lower visibility.

While exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

Each of the widened parts TCE1, TCE2, and TCE3, for example, may be referred to as any one of a relay electrode, a coupling part, a wide part, an expanded part, a widened part, and a base part, or simply referred to as a first part of the sensor wire TL, for example. The coupling part CT may be referred to as a contact part.

While the plane defined by the first direction X and the second direction Y is parallel to the surface of the array substrate SUB1, the surface of the array substrate SUB1 may be curved. In this case, viewed in a direction in which the display device PNL with a sensor has the largest area, a certain direction is a first direction, and a direction intersecting the first direction is a second direction. The direction in which the display device PNL with a sensor has the largest area may be defined as a third direction orthogonal to the first direction and the second direction.

What is claimed is:

1. A display device comprising:
a plurality of signal lines arrayed in a row direction in a display area;
a plurality of metal wires arrayed in the row direction in the display area, the metal wires being different from the signal lines;
a plurality of detection electrodes arrayed in a matrix of a column direction and the row direction, the detection electrodes including a first detection electrode; and
a plurality of pixels arrayed in the matrix,
wherein
the metal wires include:
a first metal wire including a first main line and a first widened part; and
a second metal wire adjacent to the first metal wire in the row direction, the second metal wire including a second main line and a second widened part,
a width of the first widened part is larger than a width of the first main line,
a width of the second widened part is larger than a width of the second main line,
the first widened part and the second widened part are located in a same pixel row, and
the first detection electrode overlaps:
the first widened part that is not connected to the first detection electrode, and
the second widened part that is connected to the first detection electrode.

2. The display device of claim 1, wherein
the first metal wire further includes a third widened part that has a width larger than the width of the first main line,
the second metal wire further includes a fourth widened part that has a width larger than the width of the second main line,
the first main line is disposed between the first widened part and the third widened part,
the second main line is disposed between the second widened part and the fourth widened part,
the first detection electrode overlaps the third widened part and the fourth widened part,
the third widened part and the fourth widened part are located in a same pixel row, and
the third widened part is not connected to the first detection electrode.

3. The display device of claim 2, wherein the fourth widened part is connected to the first detection electrode.

4. The display device of claim 2, wherein the metal wires extend parallel to the signal lines.

5. The display device of claim 4, further comprising a first insulating film, wherein the signal lines and the metal wires are in contact with the first insulating film.

6. The display device of claim 5, wherein
the first insulating film includes a first surface and a second surface opposed to the first surface,
the signal lines are in contact with the first surface, and
the first metal wire and the second metal wire are in contact with the second surface.

7. The display device of claim 5, wherein the first metal wire extends along a border between a column of pixels displaying a red color and a column of pixels displaying a green color.

8. The display device of claim 5, wherein the second metal wire extends along a border between a column of pixels displaying a green color and the column of pixels displaying a blue color.

9. The display device of claim 2, wherein the fourth widened part is not connected to the first detection electrode.

10. The display device of claim 3, wherein the first widened part and the third widened part are spaced at least one pixel row apart.

11. The display device of claim 9, wherein the first widened part and the third widened part are spaced at least one pixel row apart.

* * * * *